(12) United States Patent
Li et al.

(10) Patent No.: US 11,966,262 B2
(45) Date of Patent: Apr. 23, 2024

(54) TERMINAL WITH IMPROVED SCREEN-TO-BODY RATIO

(71) Applicant: HONOR DEVICE CO., LTD., Shenzhen (CN)

(72) Inventors: Chenlong Li, Shenzhen (CN); Xuanrui Fan, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 587 days.

(21) Appl. No.: 17/260,932

(22) PCT Filed: Sep. 29, 2018

(86) PCT No.: PCT/CN2018/108548
§ 371 (c)(1),
(2) Date: Jan. 15, 2021

(87) PCT Pub. No.: WO2020/015196
PCT Pub. Date: Jan. 23, 2020

(65) Prior Publication Data
US 2021/0271295 A1    Sep. 2, 2021

(30) Foreign Application Priority Data
Jul. 16, 2018    (CN) .......................... 201810779191.4

(51) Int. Cl.
*G01J 1/16*      (2006.01)
*G01J 1/02*      (2006.01)
(Continued)

(52) U.S. Cl.
CPC .......... *G06F 1/1684* (2013.01); *G01J 1/0271* (2013.01); *G01J 1/4204* (2013.01)

(58) Field of Classification Search
CPC ...... G06F 1/1684; G01J 1/0271; G01J 1/4204
See application file for complete search history.

(56) References Cited

U.S. PATENT DOCUMENTS 9,127,980 B2    9/2015  Pang et al.
10,490,779 B2  11/2019  Zhou et al.
(Continued)

FOREIGN PATENT DOCUMENTS

CN    103731518 A    4/2014
CN    106644061 A    5/2017
(Continued)

*Primary Examiner* — Kevin K Pyo
(74) *Attorney, Agent, or Firm* — WOMBLE BOND DICKINSON (US) LLP

(57) ABSTRACT

An embodiment of this application discloses a terminal. The terminal includes a side frame, a front cover, a back cover, a display panel, and an ambient light sensor. The front cover and the back cover respectively cover two opposite sides of the side frame. The display panel is fastened to one side of the front cover facing the back cover. An outer peripheral side of the display panel and an inner peripheral side of the side frame are disposed opposite to each other and form a light-transmitting gap therebetween. The light-transmitting gap forms a first projection on the front cover. A light sensing surface of the ambient light sensor forms a second projection on the front cover. The terminal has a relatively high screen-to-body ratio.

20 Claims, 19 Drawing Sheets

(51) Int. Cl.
*G01J 1/42* (2006.01)
*G06F 1/16* (2006.01)

(56) References Cited

U.S. PATENT DOCUMENTS

| | | | |
|---|---|---|---|
| 11,587,515 B2 * | 2/2023 | Duan | ........................ G09F 9/00 |
| 2015/0346416 A1 | 12/2015 | Wolk et al. | |
| 2018/0082659 A1 | 3/2018 | Jia et al. | |

FOREIGN PATENT DOCUMENTS

| | | |
|---|---|---|
| CN | 107748461 A | 3/2018 |
| CN | 107886927 A | 4/2018 |
| CN | 107945661 A | 4/2018 |
| CN | 108055367 A | 5/2018 |
| CN | 207530869 U | 6/2018 |
| CN | 209805867 U | 12/2019 |
| EP | 2418506 A1 | 2/2012 |
| EP | 3716253 A1 | 9/2020 |

* cited by examiner

TERMINAL WITH IMPROVED SCREEN-TO-BODY RATIO

CROSS-REFERENCE TO RELATED APPLICATIONS

This application is a national stage of International Application No. PCT/CN2018/108548, filed on Sep. 29, 2018, which claims priority to Chinese Patent Application No. 201810779191.4, filed on Jul. 16, 2018. Both of the aforementioned applications are hereby incorporated by reference in their entireties.

TECHNICAL FIELD

This application relates to the technical field of electronic products, and in particular, to a terminal.

BACKGROUND

With the rapid development of intelligent terminal products, requirements of a user on a display effect of the terminal products gradually increase. An appearance design of a full screen (that is, an ultra-narrow side frame) has been a trend of current intelligent terminal products.

A screen of a conventional terminal includes a front cover and a display panel. The front cover includes an intermediate light-transmitting region and a non-light-transmitting edge region disposed around the light-transmitting region. The display panel is fastened to the light-transmitting region for display through the light-transmitting region. The terminal further includes an ambient light sensor. The ambient light sensor is arranged on a peripheral side of the display panel and disposed close to an edge region of the front cover. Based on a field of view (FOV) requirement of the ambient light sensor, a light incident region with a relatively large area needs to be provided at a position of the edge region facing the ambient light sensor. Because the edge region needs to be provided with the light incident region with a relatively large area, a width of the edge region is difficult to reduce, and a screen-to-body ratio of the terminal is low.

SUMMARY

This application provides a terminal, which has a relatively high screen-to-body ratio.

According to a first aspect, an embodiment of this application provides a terminal. The terminal includes a side frame, a front cover, a back cover, a display panel, and an ambient light sensor. The front cover and the back cover respectively cover two opposite sides of the side frame. The display panel is fastened to one side of the front cover facing the back cover. An area of the front cover is greater than that of the display panel, and a projection of the display panel on the front cover fully falls within a range of the front cover. An outer peripheral side of the display panel and an inner peripheral side of the side frame are disposed opposite to each other and form a light-transmitting gap therebetween. The ambient light sensor is located on an inner side of the side frame and is located on one side of the display panel facing the back cover. In a thickness direction (i.e., a direction perpendicular to the front cover) of the terminal, the ambient light sensor is located below the light-transmitting gap and is located below the display panel.

The light-transmitting gap forms a first projection on the front cover. A light sensing surface of the ambient light sensor forms a second projection on the front cover. The light sensing surface is used to receive external light. The first projection covers the second projection. The light sensing surface of the ambient light sensor and the display panel are mutually staggered (i.e., not overlapped) in the thickness direction of the terminal. The front cover is provided with a first ink covering the second projection. Ambient light can enter the light sensing surface after undergoing a plurality of times of optical path changes in the first ink, so that a half-light intensity angle obtained when the ambient light sensor receives the ambient light through the first ink is greater than or equal to 30°. The first ink has a high diffusion capability. The first ink scatters the ambient light of different angles, and further irradiates light on the light sensing surface, to be sensed by the ambient light sensor.

In this embodiment, because the ambient light sensor is located on the one side of the display panel facing the back cover, and the ambient light sensor does not occupy a space of a peripheral side of the display panel, an arrangement space of the display panel is relatively large, a distance between the outer peripheral side of the display panel and the side frame is smaller, and a width of an edge region of the front cover is relatively small, thereby improving a display area of the terminal, so that the terminal has a relatively high screen-to-body ratio. In an embodiment, the terminal can implement a full screen, and a screen-to-body ratio of the terminal is greater than 90%.

The front cover is provided with the first ink, and the first ink can change a light path direction of light, so that more ambient light enters the light-transmitting gap after passing through the first ink. Therefore, even if the light-transmitting gap has a relatively small width, the ambient light sensor can still receive sufficient ambient light through the first ink, to accurately sense light intensity of an environment in which the terminal is located, thereby meeting sensing requirements of the ambient light intensity of the terminal.

The ambient light sensor is arranged below the display panel, and may be deployed on a circuit board (for example, a main board or an auxiliary board) or a flexible circuit board in the terminal. Therefore, there is a relatively low requirement on a size specification of a component of the ambient light sensor, and the terminal is applicable to more types and sizes of ambient light sensors, thereby achieving higher flexibility.

The light-transmitting gap is a gap through which light can pass between the outer peripheral side (that is, at an edge) of the display panel and the inner peripheral side of the side frame in a complete machine state. The light-transmitting gap can not only allow light to pass through, but also serve as a safety avoidance gap, so that a sufficient safety distance exists between the display panel and the side frame, to reduce a risk of damage to the display panel when the terminal is hit or fallen. In other words, the ambient light sensor in this application may receive light by using the safety avoidance gap between the display panel and the side frame without additionally adding a light-transmitting space in the terminal, thereby helping meet a small volume requirement of the terminal, so that the terminal has relatively low costs.

In this embodiment of this application, the terminal has a very low requirement on a width of the light-transmitting gap, which is approximately unconstrained. In an embodiment, the width of the light-transmitting gap is greater than or equal to 0.05 mm.

When other components are disposed in the terminal, the components need to avoid a facing space between the light sensing surface of the ambient light sensor and the light-transmitting gap. The facing space is in communication with the light-transmitting gap, and a projection of the facing space on the front cover covers the second projection.

The half-light intensity angle obtained when the ambient light sensor receives the ambient light through the first ink means that: when a first connecting line between a light source and a specific light incident region of the first ink is roughly perpendicular to the first ink, a sensing value of the ambient light sensor is a facing value; when a second connecting line between the light source and the light incident region forms a specific angle with the first connecting line, the sensing value of the ambient light sensor attenuates to 50% of a maximum value; and in this case, the angle is the half-light intensity angle obtained when the ambient light sensor receives the ambient light through the first ink.

The display panel may be a liquid crystal display (LCD), or an organic light-emitting diode (OLED) panel.

In an optional embodiment, an area of which the first ink covers the front cover is greater than that of the second projection, so that as much ambient light as possible enters the light-transmitting gap after passing through the first ink.

In an optional embodiment, a light transmittance of the first ink is greater than or equal to 1%. A higher light transmittance of the first ink indicates a higher resolution of the ambient light sensor for the external ambient light. Even if energy is greatly attenuated caused after the ambient light is processed by the first ink, the ambient light sensor can still reliably perform sensing, and ambient light intensity corresponding to an electrical signal formed by the ambient light sensor is continuous, so that backlight brightness of the display panel is continuously adjusted, to improve user experience.

In an optional embodiment, the first ink includes at least two light uniform layers that are stacked. A plurality of diffusion particles are scattered in each of the light uniform layers. Because the plurality of diffusion particles are disposed in the light uniform layer, light entering the light uniform layer can achieve a diffusion effect. The at least two light uniform layers may be formed by using a printing and curing cycle process, that is, a cycle process of "printing one light uniform layer—curing the just printed light uniform layer—printing a next light uniform layer—curing the just printed light uniform layer". Because the diffusion particles in the light uniform layers are randomly distributed in a space, the diffusion particles in the light uniform layers of different layers can generate a stacked structure in a three-dimensional space by cyclic printing and curing, to finally ensure that all incident light with a larger angle may diffuse, through the diffusion particles in the first ink, to a degree acceptable by the ambient light sensor.

Particles of different diameters may exist in the plurality of diffusion particles. A particle size range of the diffusion particles is 50 nanometers (nm) to 100 micrometers (μm). Materials of the diffusion particles are not limited to titanium oxide, polymethyl methacrylate, silicon dioxide, metal ions, and the like.

In an optional embodiment, the front cover includes a substrate, the first ink, and a second ink. The second ink is located on a surface of the substrate facing the back cover. The second ink is provided with a hollow region facing the light sensing surface. The hollow region overlaps the second projection. The first ink covers the hollow region A light transmittance of the second ink is less than the light transmittance of the first ink. The second ink is an appearance ink of the front cover, and the front cover presents a color of the second ink. The second ink plays a role in shielding light.

In an optional embodiment, the first ink further includes a color layer. The color layer is located between the at least two light uniform layers and the substrate. A color of the color layer is the same as a color of the second ink. A light transmittance of the color layer is greater than the light transmittance of the second ink. Because the color of the color layer is the same as the color of the second ink, the first ink is the same as the second ink in appearance, to ensure a hide effect in the appearance. The light transmittance of the color layer is greater than the light transmittance of the second ink, so that ambient light can enter the first ink.

A coating process of the color layer may be a screen printing or the like.

The color of the second ink is black. In this case, the color of the color layer may alternatively be black. However, because the color layer has a relatively high light transmittance, the color layer generally presents a transparent black color. The color of the color layer may alternatively vary with the color of the second ink, for example, blue, pink, red, purple, or white.

In an optional embodiment, sensitivity of the ambient light sensor is less than or equal to 0.0012 Lux/count. The ambient light sensor with high sensitivity is used in this application. High sensitivity refers to measurement of a response of a single device to external light intensity and a resolution capability of an analog-to-digital converter (ADC) of the sensor. The sensitivity "Lux/count" means that a unit of the external light intensity is lux, and output values of the analog-to-digital converter are dimensionless count values, for example, 1, 2, 3, and so on. That is, stronger light intensity indicates a larger output value (corresponding to the electrical signal described above) of the device analog-to-digital converter. The sensitivity of the ambient light sensor in this application may be less than or equal to 0.0012 Lux/count, an integration time is 100 milliseconds (ms), and smaller sensitivity specification data is better.

In this embodiment, even if the intensity of the ambient light passing through the first ink attenuates seriously, but the sensitivity of the ambient light sensor is high enough to reliably sense the ambient light intensity of the environment in which the terminal is located, and the sensing performance is level with or even surpasses the sensing performance of a conventional ambient light sensing solution, so that not only a full screen design requirement of the terminal is met, but also a sensing requirement of the ambient light intensity can be met.

In an optional embodiment, the light sensing surface includes a first light sensing channel and a second light sensing channel. The first light sensing channel includes a plurality of first light sensing units. The second light sensing channel includes a plurality of second light sensing units. The plurality of first light sensing units and the plurality of second light sensing units jointly form a light sensing unit array. The first light sensing units and the second light sensing units are alternately arranged in a row direction and a column direction of the light sensing unit array. The row direction or the column direction is the same as an extending direction of the first projection.

In this embodiment of this application, the electrical signal of the ambient light sensor is formed according to a condition of light received by the first light sensing channel and the second light sensing channel. Therefore, ambient light needs to evenly enter the first light sensing channel and the second light sensing channel. The row direction or the column direction is the same as the extending direction of the first projection, and the first light sensing unit and the second light sensing unit are alternately arranged in the row direction or the column direction. Therefore, regardless of how conditions of the light-transmitting gap change (for example, a change caused due to manufacturing or assembly tolerance), actual effective areas of the first light sensing channel and the second light sensing channel for receiving the ambient light vary linearly. That is, both equally increase or decrease simultaneously, so that the ambient light sensor can reliably sense the light intensity of the environment in which the terminal is located.

Certainly, in other embodiments, the light sensing surface may alternatively include a larger quantity of light sensing channels. In different gap conditions, actual effective areas of the light sensing channels for receiving the ambient light are equal or almost equal.

The light sensing surface is close to a packaging edge of the ambient light sensor. Because the light-transmitting gap is close to the side frame, and when the light sensing surface is close to the packaging edge of the ambient light sensor, that the packaging edge of the ambient light sensor is arranged close to the side frame can meet an assembly requirement. However, a layout requirement on the circuit board of the terminal is relatively low, to improve the product yield of the terminal, and reduce the costs of the terminal.

In an optional embodiment, the row direction is the same as the extending direction of the first projection, and in the light sensing unit array, a total quantity of first light sensing units and second light sensing units that are located in a same row is greater than a total quantity of first light sensing units and second light sensing units that are located in a same column.

Alternatively, the column direction is the same as the extending direction of the first projection, and in the light sensing unit array, a total quantity of first light sensing units and second light sensing units that are located in a same column is greater than a total quantity of first light sensing units and second light sensing units that are located in a same row.

In this embodiment, the light sensing unit array is generally in a long strip shape, and a long side is parallel to the extending direction of the first projection. That is, the light sensing unit array is generally in a form parallel to the first projection, so that more light sensing units may be arranged in the light sensing unit array, and the actual effective area of the light sensing surface is larger, thereby improving a sensing capability and reliability of the ambient light sensor.

In an optional embodiment, in the extending direction of the first projection, a size of the first ink is greater than or equal to 2×S×tan β, where S is a spacing between the front cover and the light sensing surface, and β is a device half-light intensity angle of the ambient light sensor. The device half-light intensity angle is a half-light intensity angle of the ambient light sensor.

In this embodiment, the size of the first ink may be roughly equal to a size of the second projection in a direction perpendicular to the extending direction of the first projection. In the extending direction of the first projection, the size of the first ink varies with the device half-light intensity angle of the ambient light sensor and the spacing between the light sensing surface and the front cover. In this case, the first ink is generally in a long strip shape, and more ambient light can enter the ambient light sensor through the first ink.

In an optional embodiment, the side frame has a limiting surface and a supporting surface connected to the limiting surface. The limiting surface encloses and forms a mounting space. The front cover is partially or fully accommodated in the mounting space. The front cover includes a bottom surface and a side surface connected to an edge of the bottom surface. The bottom surface is fixedly connected to the supporting surface by using an adhesive layer. The bottom surface is roughly parallel to the supporting surface. The side surface faces the limiting surface. The limiting surface roughly stands sideways relative to the supporting surface.

The adhesive layer may be formed by using a double-sided adhesive or dispensing adhesive.

In an optional embodiment, the light-transmitting gap includes a light sensing portion facing the light sensing surface. The supporting surface includes an inclined portion. The inclined portion is located between the limiting surface and the light sensing portion. An acute angle is formed between the inclined portion and the limiting surface. The acute angle is less than or equal to 60°, for example, 45°, 50°, 55°, or 60°. The adhesive layer is formed by curing liquid glue.

In this embodiment, the inclined portion is disposed close to the light sensing portion. Because the acute angle is formed between the inclined portion and the limiting surface, when the liquid glue is coated on the supporting surface, the inclined portion can enable the glue to flow in a direction away from the light sensing portion, and the glue located on the inclined portion is prevented from overflowing and entering the light sensing portion, to avoid overflow glue in the adhesive layer that shields the ambient light sensor from receiving the optical path, thereby improving the product yield of the terminal.

In an extending direction of the light-transmitting gap, a length of the inclined portion is greater than a length of the light sensing portion. In this case, a risk of overflowing glue from the adhesive layer into the light sensing portion is lower.

In an optional embodiment, the side frame includes at least two supporting platforms protruding from the supporting surface. The at least two supporting platforms are located on two sides of the inclined portion respectively.

In this embodiment, when the front cover is fastened to the side frame, the supporting platform can support the front cover, so as to ensure an adhesion effect of the adhesive layer, and avoid that when the liquid glue is not cured, a large quantity of glue penetrates into the light sensing portion of the light-transmitting gap caused by excessively pressing the liquid glue, thereby improving the product yield of the terminal.

In an optional embodiment, a gap is formed between the side surface and the limiting surface. The gap is filled with an adhesive member. The adhesive member and the adhesive layer are integrally cured and formed by using liquid transparent glue. The ambient light can enter the light-transmitting gap after undergoing a plurality of times of optical path changes in the adhesive member and the adhesive layer.

In this embodiment, because the ambient light can enter the light-transmitting gap after undergoing a plurality of times of optical path changes in the adhesive member and the adhesive layer, the ambient light may enter the ambient light sensor through the front cover and the first ink, or may enter the ambient light sensor through the adhesive member in the gap, so that the ambient light sensor can receive more ambient light, thereby improving sensing performance of the ambient light sensor.

The adhesive member and the adhesive layer that are formed after the liquid transparent glue is cured are generally white in appearance, and have specific light diffusion performance.

In an optional embodiment, the terminal further includes a light shielding member. The light shielding member is located between the outer peripheral side of the display panel and the inner peripheral side of the side frame, and covers the outer peripheral side of the display panel. The light shielding member is configured to shield light of the display panel, to reduce a risk of sensing distortion of the ambient light sensor caused by light leakage of the display panel.

The light shielding member may be a housing portion of the terminal, or may be an additional structural member that uses an opaque material, or may be another structure that shields light inside the terminal.

When brightness of the display panel is the highest and the environment in which the terminal is located is all dark, light intensity corresponding to the electric signal emitted by the ambient light sensor is less than or equal to 20 lux. When the brightness of the display panel is the lowest and the environment in which the terminal is located is all dark, light intensity corresponding to the electric signal emitted by the ambient light sensor is less than or equal to 5 lux.

Because the spacing between the light sensing surface of the ambient light sensor and the front cover is large, and the ambient light sensor is located between the display panel and the back cover, a path of light leaked from a side surface of the display panel to the light sensing surface is abnormally twisted, and energy attenuation caused by light path changes such as refraction and reflection in a light transmission process is significant. Therefore, the light leaked from the side surface of the display panel has little or even little impact on a sensing result of the ambient light sensor, the ambient light sensor has relatively high tolerance to the brightness of the display panel, and a signal-to-noise ratio is relatively high.

In an optional embodiment, a spacing between the light sensing surface and the first ink is greater than a thickness of the display panel in a direction perpendicular to the front cover. Because the first ink changes a light path direction of light, the first ink may transmit more ambient light to the light-transmitting gap, so that the ambient light sensor located on the other side of the light-transmitting gap can sense sufficient ambient light. Therefore, a spacing between the ambient light sensor and the front cover is no longer strictly limited, and the spacing may vary with the thickness of the display panel, so that the ambient light sensor is located below the display panel.

In an optional embodiment, the terminal further includes a middle panel. The middle panel is located on the inner side of the side frame and is located between the display panel and the ambient light sensor. A peripheral side of the middle panel is fixedly connected to the inner peripheral side of the side frame. The middle panel may be integrally formed with the side frame. The middle panel is provided with a light-transmitting hole. The light-transmitting hole is in communication with the light-transmitting gap. The light-transmitting hole is a part of the facing space. A projection of the light-transmitting hole on the front cover covers the second projection. A position of the light-transmitting hole varies with a position of the ambient light sensor, that is, varies with a position of the second projection.

In an optional embodiment, there are at least two ambient light sensors. Light sensing surfaces of the at least two ambient light sensors form, on the front cover, at least two second projections spaced from each other. In this case, the ambient light sensors are arranged at different positions, and can receive ambient light from different positions of the front cover, and cooperative work of the at least two ambient light sensors helps improve accuracy of sensing ambient light intensity by the terminal.

In an optional embodiment, the display panel forms a third projection on the front cover. The first projection continuously surrounds a periphery of the third projection. The at least two second projections are arranged at intervals in the extending direction of the first projection.

In this embodiment of this application, a shape of the first projection varies with a contour of the third projection. The at least two second projections may be at any position of the first projection. That is, there are a plurality of position arrangement relationships relative to the third projection. For example, the at least two second projections may be located on a same side of the third projection, or may be located on different sides of the third projection. A position of the first ink varies with the position of the second projection. The first ink covering the second projection may be located at any position of the first projection, that is, at any position around the display panel.

In an optional embodiment, the at least two second projections are arranged at equal intervals.

In an optional embodiment, there is one first ink, and the first ink covers all the at least two second projections. For example, if the first ink covers first projections continuously, the first ink covers all the at least two second projections. In another embodiment, the first ink may alternatively cover a part of the first projection, and cover all the at least two second projections.

Alternatively, there are at least two first inks, and the at least two first inks cover the at least two second projections in a one-to-one correspondence. In other words, different second projections are covered by different first inks. When the colors of the second ink include a plurality of colors, colors of the color layers of the at least two first inks vary with the colors of the second ink that are similar to the colors of the color layers.

In an optional embodiment, the side frame has a left side surface and a right side surface that are disposed facing away from each other. A center surface between the left side surface and the right side surface is a central axis surface. The ambient light sensor is located between the central axis surface and the left side surface, and a spacing between the ambient light sensor and the central axis surface is less than a spacing between the ambient light sensor and the left side surface. That is, the ambient light sensor is disposed close to the central axis surface.

In a use environment, the ambient light sensor is deployed at a top of the terminal. In another use environment, the ambient light sensor is deployed at a bottom of the terminal. In this case, the ambient light sensor is disposed close to the central axis surface, to reduce a risk that the ambient light is shielded by a palm of a user and cannot be sensed by the ambient light sensor when the user holds the terminal, thereby improving the sensing reliability of the ambient light sensor of the terminal.

The ambient light sensor is located between the central axis surface and the left side surface, to avoid a risk that the ambient light sensor is shielded with a relatively high probability considering that more people in the users who are accustomed to right-handed than people who are accustomed to left-right handed.

In another embodiment, the ambient light sensor may alternatively be located between the central axis surface and the right side surface.

According to a second aspect, an embodiment of this application further provides terminal. The terminal includes a side frame, a front cover, a back cover, a display panel, and an ambient light sensor. The front cover and the back cover respectively cover two opposite sides of the side frame. The side frame has a limiting surface and a supporting surface connected to the limiting surface. The limiting surface encloses and forms a mounting space. The front cover is partially or fully accommodated in the mounting space. The front cover includes a bottom surface and a side surface connected to an edge of the bottom surface. The bottom surface is fixedly connected to the supporting surface by using an adhesive layer. The side surface is fixedly connected to the limiting surface by using an adhesive member. A gap is formed between the side surface and the limiting surface, and the gap is filled with the adhesive member. The adhesive member and the adhesive layer are integrally cured and formed by using liquid transparent glue. The adhesive member and the adhesive layer formed after the liquid transparent glue is cured are generally white in appearance, and have specific light diffusion performance.

The display panel is fastened to the bottom surface. An outer peripheral side of the display panel and an inner peripheral side of the side frame are disposed opposite to each other and form a light-transmitting gap therebetween. The ambient light sensor is located on an inner side of the side frame and is located on one side of the display panel facing the back cover. The light-transmitting gap forms a first projection on the front cover. A light sensing surface of the ambient light sensor forms a second projection on the front cover. The first projection covers the second projection. In this case, the light sensing surface faces the light-transmitting gap. The ambient light can enter the light-transmitting gap after undergoing a plurality of times of optical path changes in the adhesive member and the adhesive layer.

In this embodiment of this application, because the ambient light sensor is located on the one side of the display panel facing the back cover, and the ambient light sensor does not occupy a space of the peripheral side of the display panel, an arrangement space of the display panel is relatively large, and a distance between the periphery of the display panel and the side frame is smaller, thereby improving a display area of the terminal, so that the terminal has a relatively high screen-to-body ratio. In an embodiment, the terminal can implement a full screen, and a screen-to-body ratio of the terminal is greater than 90%.

Because the ambient light may enter the light-transmitting gap through the adhesive member and the adhesive layer, and is received by the light sensing surface facing the light-transmitting gap, the ambient light sensor may receive the ambient light through a gap between the front cover and the side frame and a light-transmitting gap between the display panel and the side frame. Therefore, even if no light-transmitting region configured to transmit the ambient light is disposed on the front cover, the ambient light sensor can still receive sufficient ambient light, to accurately sense light intensity of an environment in which the terminal is located, thereby meeting sensing requirements of the ambient light intensity of the terminal.

In an optional embodiment, the light-transmitting gap includes a light sensing portion facing the light sensing surface. The supporting surface includes an inclined portion. The inclined portion is located between the limiting surface and the light sensing portion. An acute angle is formed between the inclined portion and the limiting surface. The acute angle is less than or equal to 60°, for example, 45°, 50°, 55°, or 60°.

In this embodiment, the inclined portion is disposed close to the light sensing portion. Because the acute angle is formed between the inclined portion and the limiting surface, when the liquid transparent glue is coated on the supporting surface, the inclined portion can enable the glue to flow in a direction away from the light sensing portion, and the glue located on the inclined portion is prevented from overflowing and entering the light sensing portion, to avoid overflow glue in the adhesive layer that shields the ambient light sensor from receiving the optical path, thereby improving the product yield of the terminal.

In an extending direction of the light-transmitting gap, a length of the inclined portion is greater than a length of the light sensing portion. In this case, a risk of overflowing glue from the adhesive layer into the light sensing portion is lower.

In an optional embodiment, the side frame includes at least two supporting platforms protruding from the supporting surface, and the at least two supporting platforms are located on two sides of the inclined portion respectively. In this embodiment, when the front cover is fastened to the side frame, the supporting platform can support the front cover, so as to ensure an adhesion effect of the adhesive layer, and avoid that when the liquid glue is not cured, a large quantity of glue penetrates into the light sensing portion of the light-transmitting gap caused by excessively pressing the liquid glue, thereby improving the product yield of the terminal.

In an optional embodiment, a plurality of diffusion particles are scattered in the adhesive member and the adhesive layer. Particles of different diameters may exist in the plurality of diffusion particles. The particle size range of the diffusion particles is 50 nm to 100 μm. The materials of the diffusion particles are not limited to titanium oxide, polymethyl methacrylate, silicon dioxide, metal ions, and the like. The plurality of diffusion particles help improve the light diffusion performance of the adhesive member and the adhesive layer.

According to the terminal provided in the first aspect and the second aspect, in an optional embodiment, the terminal includes a first part and a second part. The second part and the first part are slidable relative to each other. The first part includes the side frame, the front cover, the back cover, the display panel, and the ambient light sensor in the foregoing embodiments. When the second part and the first part slide relative to each other and are in an open state, the second part and the first part do not overlap or partially overlap. When the second part and the first part slide relative to each other and are in a closed state, the second part and the first part almost fully overlap, or the second part is located in a space of the first part. The form of the terminal is not limited in this embodiment of this application.

DESCRIPTION OF EMBODIMENTS

The following describes the embodiments of this application with reference to the accompanying drawings in the embodiments of this application.

Figure 1A:
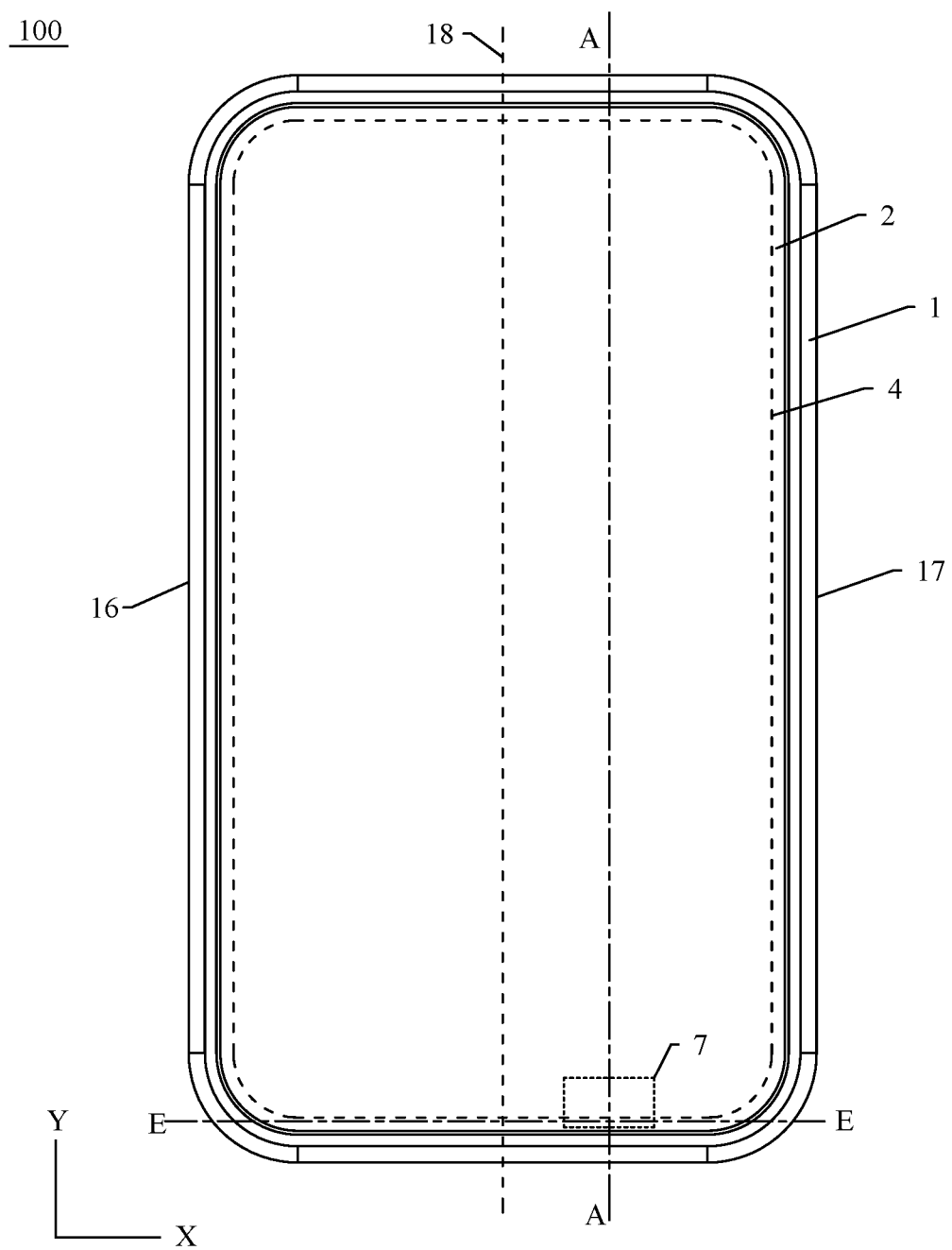
FIG. 1A is a schematic structural diagram of a terminal according to an embodiment of this application.
Figure 2:
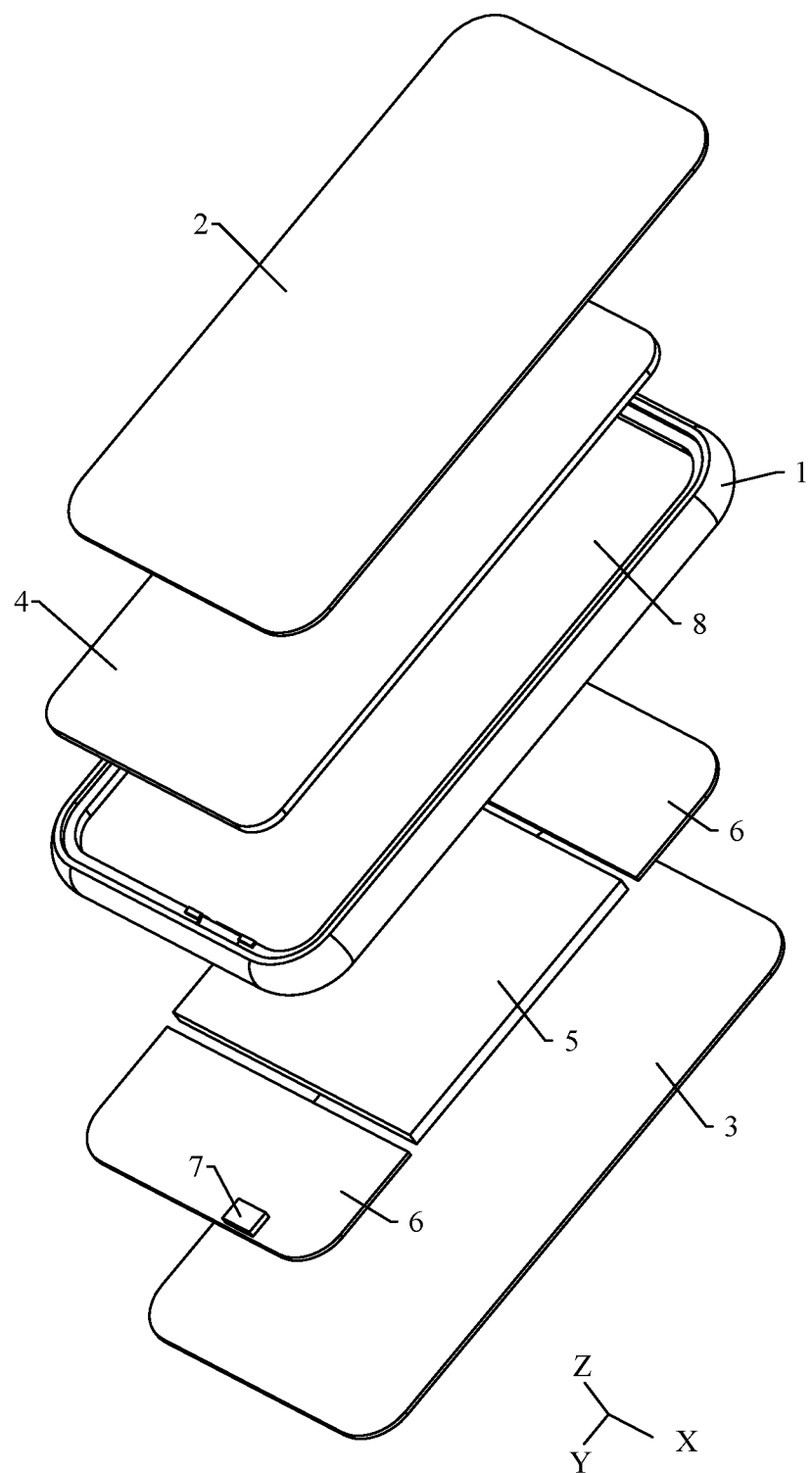
FIG. 2 is a partial schematic exploded view of the terminal shown in FIG. 1A.
Figure 3:
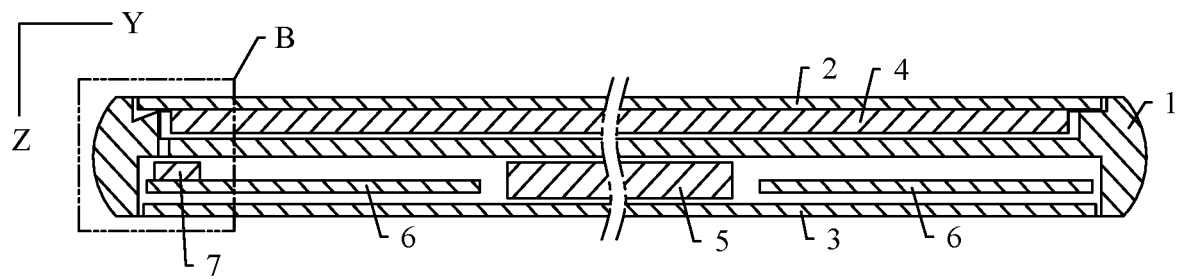
FIG. 3 is a cross-sectional view of a partial structure of the terminal at a line A-A shown in FIG. 1A.

Referring to FIG. 1A, FIG. 2, and FIG. 3 together, FIG. 1A is a schematic structural diagram of a terminal 100 according to an embodiment of this application. FIG. 2 is a partial schematic exploded view of the terminal 100 shown in FIG. 1A. FIG. 3 is a cross-sectional view of a partial structure of the terminal 100 at a line A-A shown in FIG. 1A. For ease of description, in this embodiment, the terminal 100 being at a visual angle shown in FIG. 1A is used as a reference for definition. A width direction of the terminal 100 is an X direction in FIG. 1A, a length direction of the terminal 100 is a Y direction in FIG. 1A, a thickness direction of the terminal 100 is a Z direction in FIG. 2, and the thickness direction Z is perpendicular to the width direction X and the length direction Y.

The terminal 100 may be, for example, a tablet computer, a mobile phone, an electronic reader, a notebook computer, an in-vehicle device, or a wearable device. In the embodiment shown in FIG. 1, description is made by using an example in which the terminal 100 is a mobile phone.

The terminal 100 includes a side frame 1, a front cover 2, a back cover 3, a display panel 4, a battery 5, a circuit board 6, and an ambient light sensor 7. The side frame 1 is in an integrated structure, and the side frame 1 is provided with two roughly opposite openings. The front cover 2 and the back cover 3 are disposed on two opposite sides of the side frame 1 respectively. The front cover 2 and the back cover 3 respectively cover the two openings of the side frame 1. The front cover 2, the side frame 1, and the back cover 3 jointly enclose an integrated machine inner cavity. When a user uses the terminal 100, the front cover 2 may face the user, and the back cover 3 may be away from the user. The side frame 1 and the back cover 3 may be integrally formed. In this case, the side frame 1 and the back cover 3 may be made of metal materials. Alternatively, the side frame 1 and the back cover 3 may be assembled to form an integrated structure. In this case, the side frame 1 may be made of a metal material. The back cover 3 may be of a metal material or a glass material.

The display panel 4 is accommodated in the integrated machine inner cavity. The display panel 4 is fastened to one side of the front cover 2 facing the back cover 3. The display panel 4 may be, for example, a liquid crystal display (LCD) or an organic light-emitting diode (OLED) panel. The display panel 4 may be a touch panel. As shown in FIG. 1, an area of the front cover 2 is greater than that of the display panel 4, and a projection of the display panel 4 on the front cover 2 fully falls within a range of the front cover 2. The battery 5 is accommodated in the integrated machine inner cavity. The battery 5 is located between the display panel 4 and the back cover 3. The battery 5 is configured to supply power to components and modules of the terminal 100. The circuit board 6 is accommodated in the integrated machine inner cavity. The circuit board 6 is located between the display panel 4 and the back cover 3. There may be one or more circuit boards 6. In this application, description is made by using an example in which the terminal 100 includes two circuit boards 6, and the two circuit boards 6 are located on two sides of the battery 5 respectively. The ambient light sensor 7 is fastened to the circuit board 6. The ambient light sensor 7 is located on an inner side of the side frame 1 and is located on one side of the display panel 4 facing the back cover 3. That is, in the thickness direction Z (i.e., a direction perpendicular to the front cover 2) of the terminal 100, the ambient light sensor 7 is located between the display panel 4 and the back cover 3. The circuit board 6 may further be provided with another component.

It may be understood that, in the embodiments shown in FIG. 1A, FIG. 2, and FIG. 3, the side frame 1 is of an integrated structure. Therefore, the front cover 2 and the back cover 3 that cover two sides of the side frame 1 and the side frame 1 jointly enclose the integrated machine inner cavity.

Figure 1B:
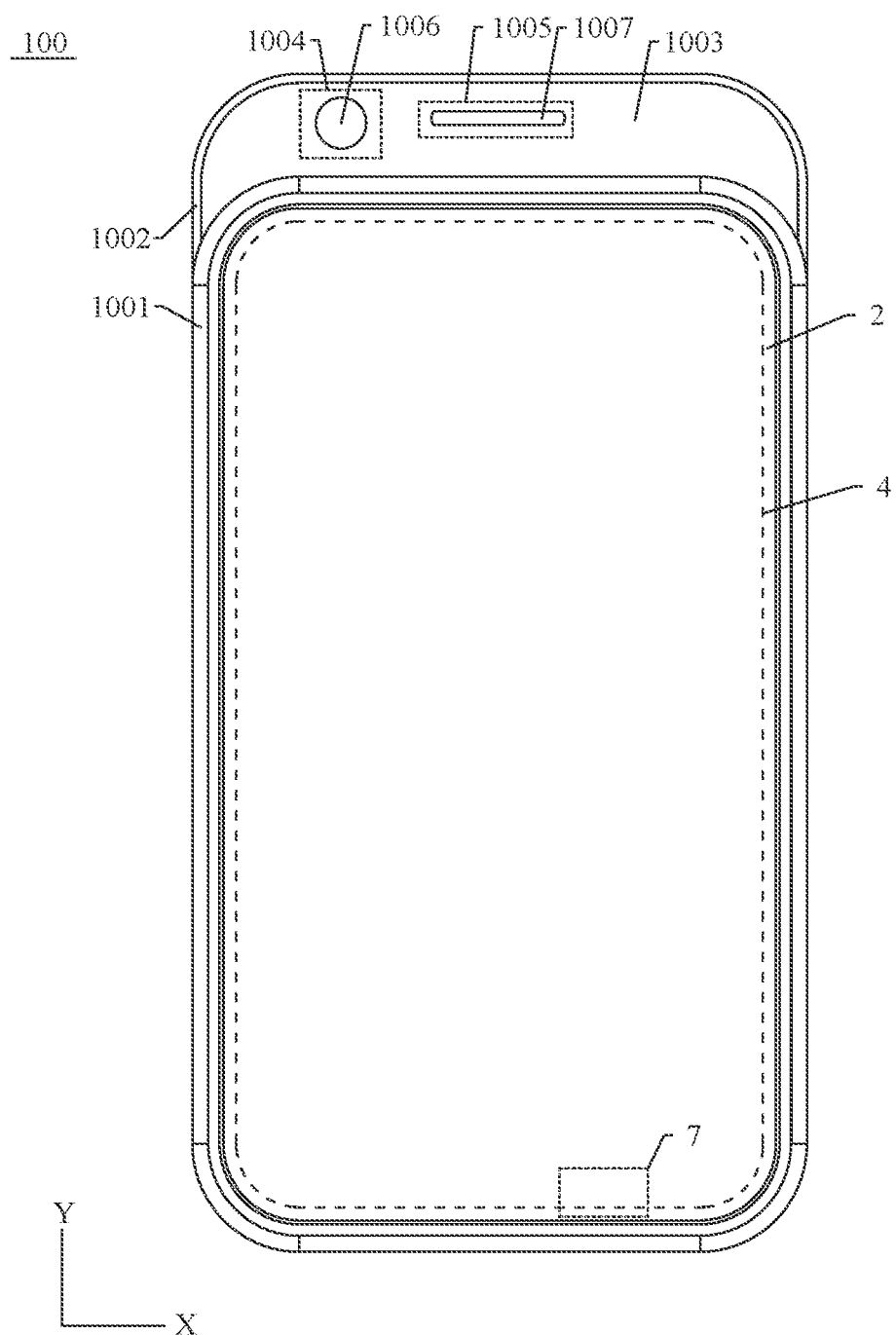
FIG. 1B is a schematic structural diagram of a terminal according to another embodiment of this application.

In another embodiment, the terminal may be in another form. For example, the terminal may include two parts that are slidable relative to each other. The terminal includes a first part and a second part. The second part and the first part are slidable relative to each other. The first part includes the side frame 1, the front cover 2, the back cover 3, the display panel 4, and the ambient light sensor 7 in other embodiments. When the second part and the first part slide relative to each other and are in an open state, the second part and the first part may not overlap or partially overlap. When the second part and the first part slide relative to each other and are in a closed state, the second part and the first part almost fully overlap, or the second part is located in a space of the first part. A volume of the second part may be less than that of the first part, or volumes of the second part and the first part may be roughly the same. The form of the terminal is not limited in this embodiment of this application. FIG. 1B is a schematic structural diagram of a terminal 100 according to another embodiment of this application.

The terminal 100 includes an upper side frame 1001 and a lower side frame 1002, and the upper side frame 1001 and the lower side frame 1002 can slide with each other. In this case, the front cover 2 may be fastened to a side of the upper side frame 1001 away from the lower side frame 1002, and the back cover 3 (the back cover 3 is not shown in FIG. 1B due to a visual angle relationship) may be fastened to a side of the upper side frame 1001 facing the lower side frame 1002. That is, the front cover 2 and the back cover 3 are located, facing away from each other, on front and back sides of the upper side frame 1001. The front cover 2, the upper side frame 1001, and the back cover 3 may jointly enclose a first accommodating space. The display panel 4 and the ambient light sensor 7 may be accommodated in the first accommodating space. In addition, the terminal 100 further includes an upper cover plate 1003 and a lower cover plate (the lower cover plate is not shown in FIG. 1B due to a visual angle relationship). The upper cover plate 1003 is fastened to one side of the lower side frame 1002 facing the upper side frame 1001, and the lower cover plate is fastened to one side of the lower side frame 1002 away from the upper side frame 1001. That is, the upper cover plate 1003 and the lower cover plate are located, facing away from each other, on front and back sides of the lower side frame 1002. The upper cover plate 1003 and the back cover 3 are disposed opposite to each other, and the lower cover plate and the front cover 2 are disposed facing away from each other. The upper cover plate 1003, the lower side frame 1002, and the lower cover plate jointly enclose a second accommodating space. Both the second accommodating space and the first accommodating space may be used to accommodate an internal component of the terminal 100. The first part of the terminal 100 includes the front cover 2, the upper side frame 1001, the back cover 3, and the component in the first accommodating space. The second part of the terminal 100 includes the upper cover plate 1003, the lower side frame 1002, the lower cover plate, and the component in the second accommodating space. The second part and the first part of the terminal are slidable relative to each other. It should be noted that, the upper side frame 1001 in this embodiment is equivalent to the side frame 1 in another embodiment. The front cover 2 in this embodiment is equivalent to the front cover 2 in another embodiment. The back cover 3 in this embodiment is equivalent to the back cover 3 in another embodiment. Positions and structures of the display panel 4 and the ambient light sensor 7 in the terminal in this embodiment are the same as those in another embodiment. That is, the structures described in other embodiments are applicable to the terminal in this embodiment.

In FIG. 1B, for example, components such as a camera 1004 and a telephone receiver 1005 may be disposed in the second accommodating space. A light-transmitting portion 1006 may be disposed on the upper cover plate 1003, so that the camera 1004 collects light by using the light-transmitting portion 1006. A telephone receiving hole 1007 may be provided on the upper cover plate 1003, so that the telephone receiver 1005 makes a sound through the telephone receiving hole 1007. When the upper side frame 1001 and the lower side frame 1002 slide relative to each other and are in an open state (that is, a state shown in FIG. 1B), the light-transmitting portion 1006 and the telephone receiving hole 1007 are exposed relative to the front cover 2. When the upper side frame 1001 and the lower side frame 1002 slide relative to each other and are in a closed state (an outer peripheral side surface of the upper side frame 1001 and an outer peripheral side surface of the lower side frame 1002 are roughly flush), the light-transmitting portion 1006 and the telephone receiving hole 1007 overlap relative to the front cover 2, and the light-transmitting portion 1006 and the telephone receiving hole 1007 are hidden inside the terminal 100.

Figure 4:
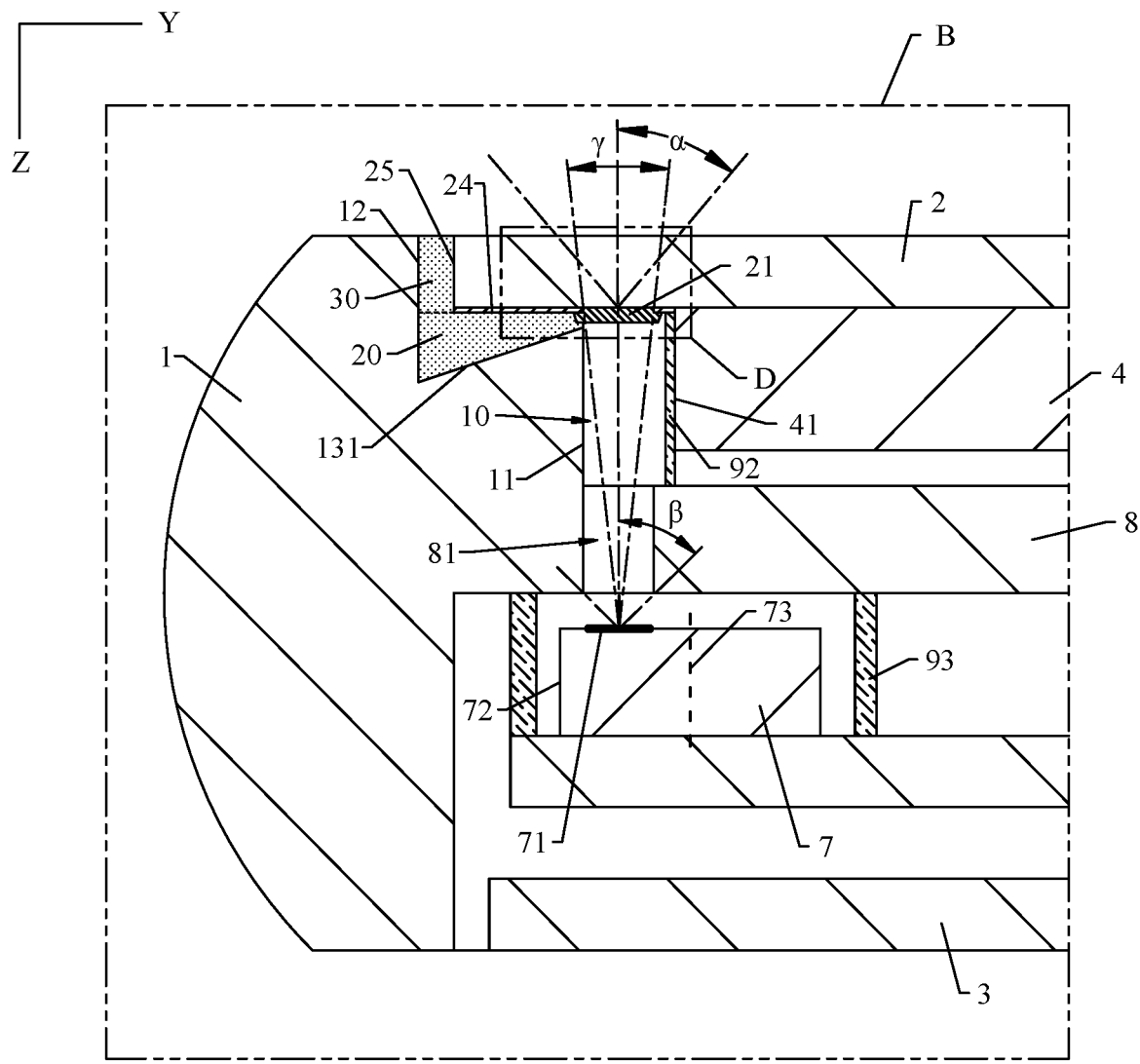
FIG. 4 is an enlarged schematic diagram of a structure at a position B in FIG. 3 in an implementation.
Figure 5:
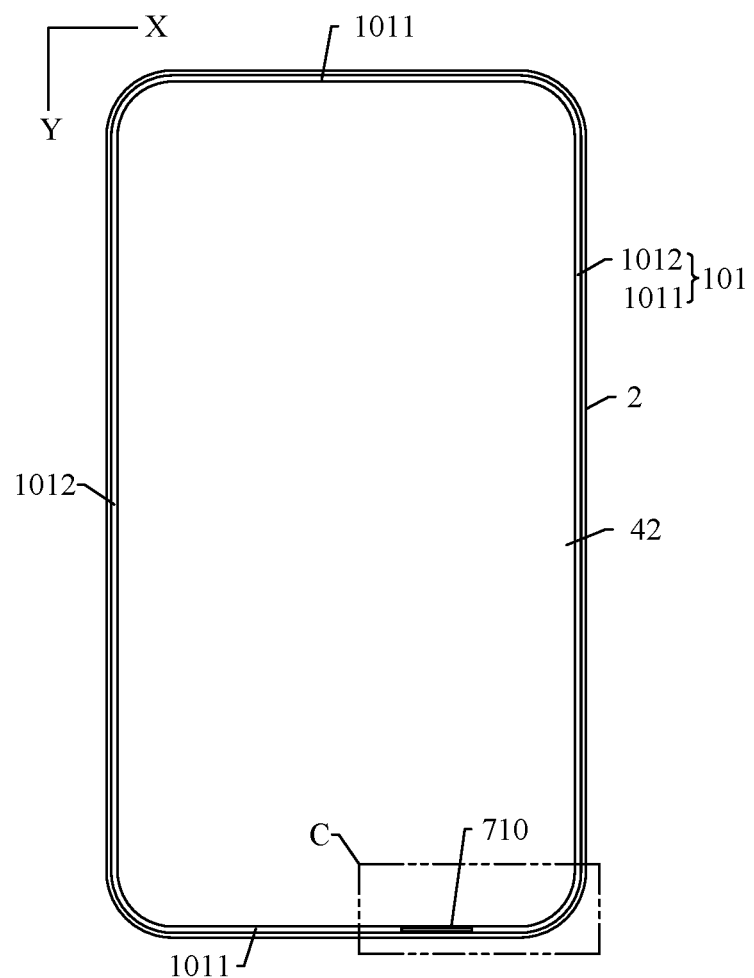
FIG. 5 is a schematic diagram of a projection of a partial structure of the terminal shown in FIG. 1A on a front cover.
Figure 6:
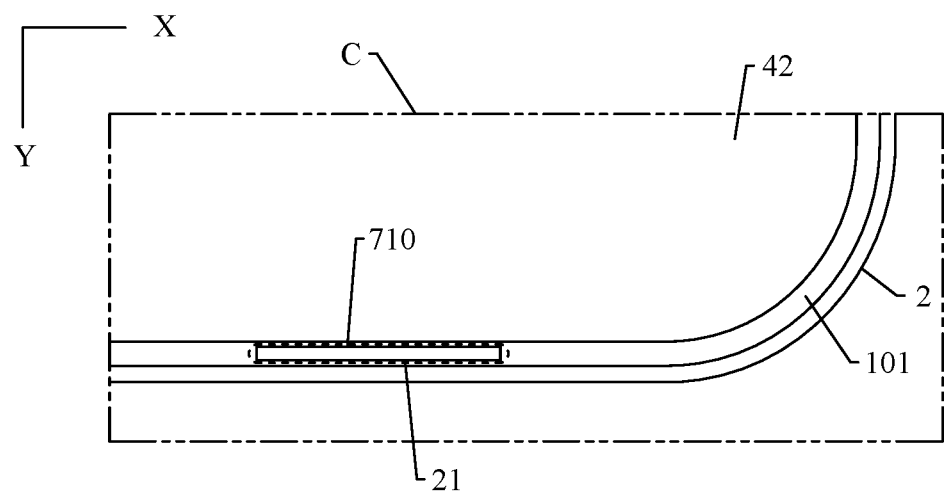
FIG. 6 is an enlarged schematic diagram of a structure at a position C in FIG. 5.

Referring to FIG. 4 to FIG. 6 together, FIG. 4 is an enlarged schematic diagram of a structure at a position B in FIG. 3 in an implementation. FIG. 5 is a schematic diagram of a projection of a partial structure of the terminal 100 shown in FIG. 1A on a front cover 2. FIG. 6 is an enlarged schematic diagram of a structure at a position C in FIG. 5.

An outer peripheral side 41 of the display panel 4 and an inner peripheral side 11 of the side frame 1 are disposed opposite to each other and form a light-transmitting gap 10 therebetween. The light-transmitting gap 10 forms a first projection 101 on the front cover 2. The display panel 4 forms a third projection 42 on the front cover 2. The first projection 101 continuously surrounds a periphery of the third projection 42. The ambient light sensor 7 is located on an inner side of the side frame 1 and is located on one side of the display panel 4 facing the back cover 3. In the thickness direction Z (a direction perpendicular to the front cover 2) of the terminal 100, the ambient light sensor 7 is located below the light-transmitting gap 10 and is located below the display panel 4. A light sensing surface 71 of the ambient light sensor 7 forms a second projection 710 on the front cover 2. The light sensing surface 71 is used to receive external light. The first projection 101 covers the second projection 710. The light sensing surface 71 of the ambient light sensor 7 and the display panel 4 are mutually staggered (i.e., not overlapped) in the thickness direction Z of the terminal 100.

The front cover 2 is provided with a first ink 21 covering the second projection 710. The ambient light enters the light sensing surface 71 after undergoing a plurality of times of optical path changes in the first ink 21, so that a half-light intensity angle $\alpha$ when the ambient light sensor 7 receives the ambient light through the first ink 21 is greater than or equal to 30°. The first ink 21 has a high diffusion capability. The first ink scatters ambient light of different angles, and further irradiates light on the light sensing surface 71, to be sensed by the ambient light sensor 7.

In this embodiment, because the ambient light sensor 7 is located on the one side of the display panel 4 facing the back cover 3, and the ambient light sensor 7 does not occupy a space of the peripheral side of the display panel 4, an arrangement space of the display panel 4 is relatively large, a distance between the outer peripheral side 41 of the display panel 4 and the side frame 1 is smaller, and a width of an edge region of the front cover 2 is relatively small, thereby improving a display area of the terminal 100, so that the terminal 100 has a relatively high screen-to-body ratio. In an embodiment, the terminal 100 can implement a full screen, and a screen-to-body ratio of the terminal 100 is greater than 90%.

The front cover 2 is provided with the first ink 21, and the first ink 21 may change a light path direction of light, so that more ambient light enters the light-transmitting gap 10 after passing through the first ink 21. Therefore, even if the light-transmitting gap 10 has a relatively small width, the ambient light sensor 7 can still receive sufficient ambient light through the first ink 21, to accurately sense light intensity of an environment in which the terminal 100 is located, thereby meeting sensing requirements of the ambient light intensity of the terminal.

The ambient light sensor 7 is arranged below the display panel 4, and may be deployed on a circuit board 6 (for example, a main board or an auxiliary board) or a flexible circuit board in the terminal 100. Therefore, there is a relatively low requirement on a size specification of a component of the ambient light sensor 7, and the terminal 100 is applicable to more types and sizes of ambient light sensors 7, thereby achieving higher flexibility. In addition, because the light-transmitting gap 10 continuously surrounds the periphery of the display panel 4, the ambient light sensor 7 partially facing the light-transmitting gap 10 may be arranged in a plurality of positions of the terminal 100. For example, the ambient light sensor 7 may be arranged on a top, a bottom, a left-side portion, a right-side portion, or the like of the terminal 100. In the terminal 100 shown in FIG. 1A, description is made by using an example in which the ambient light sensor 7 is arranged at the bottom of the terminal 100.

The light-transmitting gap 10 is a gap through which light can pass between the outer peripheral side 41 (that is, at the edge) of the display panel 4 and the inner peripheral side 11 of the side frame 1 in a complete machine state. The light-transmitting gap 10 can not only allow light to pass through, but also serve as a safety avoidance gap, so that a sufficient safety distance exists between the display panel 4 and the side frame 1, to reduce a risk of damage to the display panel 4 when the terminal 100 is hit or fallen. In other words, the ambient light sensor 7 in this application may receive light by using the safety avoidance gap between the display panel 4 and the side frame 1 without additionally adding a light-transmitting space in the terminal 100, helping meet a small volume requirement of the terminal 100, so that the terminal 100 has low costs.

In this embodiment of this application, the terminal 100 has a very low requirement on a width of the light-transmitting gap 10, which is approximately unconstrained. In an embodiment, a width of the light-transmitting gap 10 is greater than or equal to 0.05 mm.

When other components are disposed in the terminal 100, the components need to avoid a facing space between the light sensing surface 71 of the ambient light sensor 7 and the light-transmitting gap 10. The facing space is in communication with the light-transmitting gap 10, and a projection of the facing space on the front cover 2 covers the second projection 710. For example, as shown in FIG. 2 and FIG. 4, the terminal 100 further includes a middle panel 8. A peripheral side of the middle panel 8 is fixedly connected to the inner peripheral side 11 of the side frame 1. The middle panel 8 may be integrally formed with the side frame 1. The middle panel 8 divides the integrated machine inner cavity into two parts. The display panel 4 is accommodated in an upper part, and the ambient light sensor 7, the circuit board 6, and the battery 5 are accommodated in a lower part. That is, the middle panel 8 is located on an inner side of the side frame 1 and is located between the display panel 4 and the ambient light sensor 7. The middle panel 8 is provided with a light-transmitting hole 81. The light-transmitting hole 81 is in communication with the light-transmitting gap 10. The light-transmitting hole 81 is a part of the facing space. A projection of the light-transmitting hole 81 on the front cover 2 covers the second projection 710. A position of the light-transmitting hole 81 varies with a position of the ambient light sensor 7, that is, varies with a position of the second projection 710.

The half-light intensity angle α when the ambient light sensor 7 receives the ambient light through the first ink 21 means that: when a first connecting line between a light source and a specific light incident region of the first ink 21 is roughly perpendicular to the first ink 21, a sensing value of the ambient light sensor 7 is a maximum value; and when a second connecting line between the light source and the light incident region forms a specific angle with the first connecting line, and the sensing value of the ambient light sensor 7 attenuates to 50% of the maximum value, the angle is the half-light intensity angle α when the ambient light sensor 7 receives the ambient light through the first ink 21.

Figure 7:
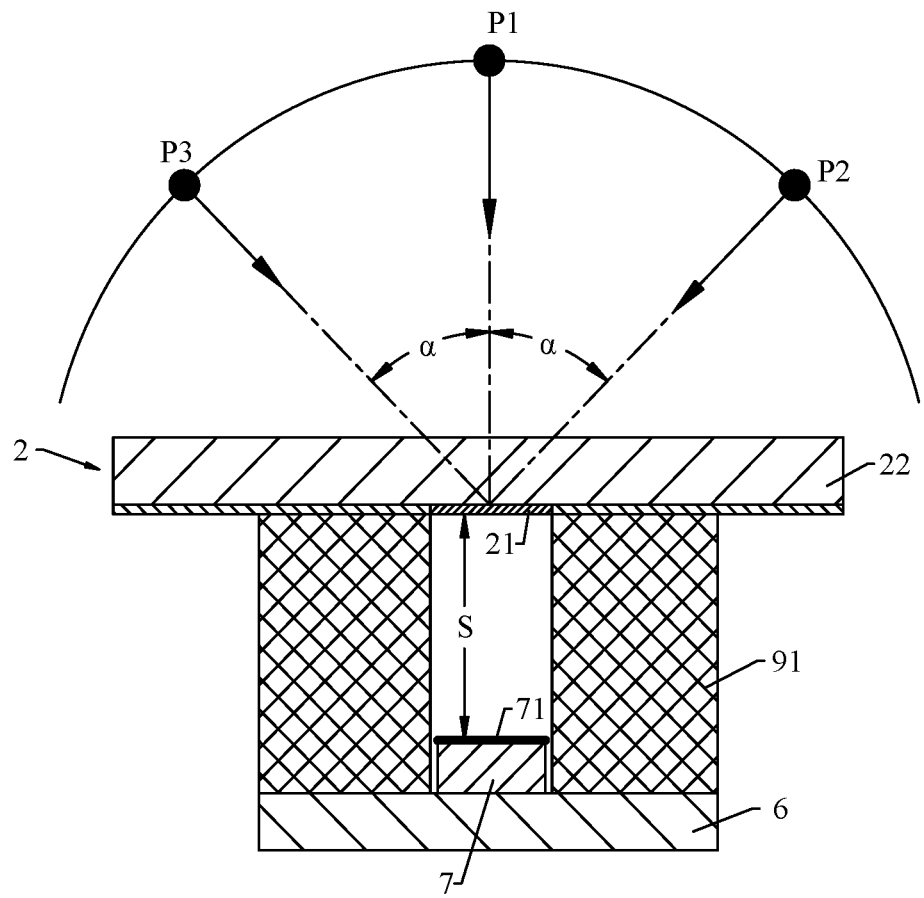
FIG. 7 is a schematic diagram of a half-light intensity angle in a possible experiment when an ambient light sensor receives ambient light by using a first ink according to an embodiment of this application.

FIG. 7 is a schematic diagram of a half-light intensity angle α in a possible experiment when an ambient light sensor 7 receives ambient light by using a first ink 21 according to an embodiment of this application.

An experimental structure of the half-light intensity angle α when the ambient light sensor 7 receives the ambient light through the first ink 21 includes the front cover 2, the circuit board 6, the ambient light sensor 7, and a light blocking member 91. The front cover 2 includes a substrate 22 and the first ink 21 formed on a side surface of the substrate 22. The first ink 21 may be generally in a circle shape, and a plane in which the structure shown in FIG. 7 is located is perpendicular to the first ink 21 and passes through a center of the first ink 21. The circuit board 6 and the front cover 2 are disposed opposite to each other. The ambient light sensor 7 is located on the circuit board 6 and is located between the front cover 2 and the circuit board 6. The light sensing surface 71 of the ambient light sensor 7 faces the first ink 21, and a projection of the light sensing surface 71 on the first ink 21 falls within a range of the first ink 21. The light blocking member 91 is made of an opaque material, and can shield visible light. The light blocking member 91 is located between the circuit board 6 and the front cover 2, and encloses a facing space between the light sensing surface 71 and the first ink 21.

When the light source is located right above an central light incident region of the first ink 21 (the light source is located at a position P1), a connecting line between the light source and the central light incident region is a first connecting line, a sensing value of the ambient light sensor 7 is a first intensity value, and the first intensity value is considered as a maximum sensing value; and when the second connecting line between the light source and the central light incident region forms an angle α with the first connecting line (the light source is located at a position P2 or a position P3), the sensing value of the ambient light sensor 7 is a second intensity value. When a ratio of the second intensity value to the first intensity value is 0.5, the angle α is the half-light intensity angle α when the ambient light sensor 7 receives the ambient light through the first ink 21.

Figure 8:
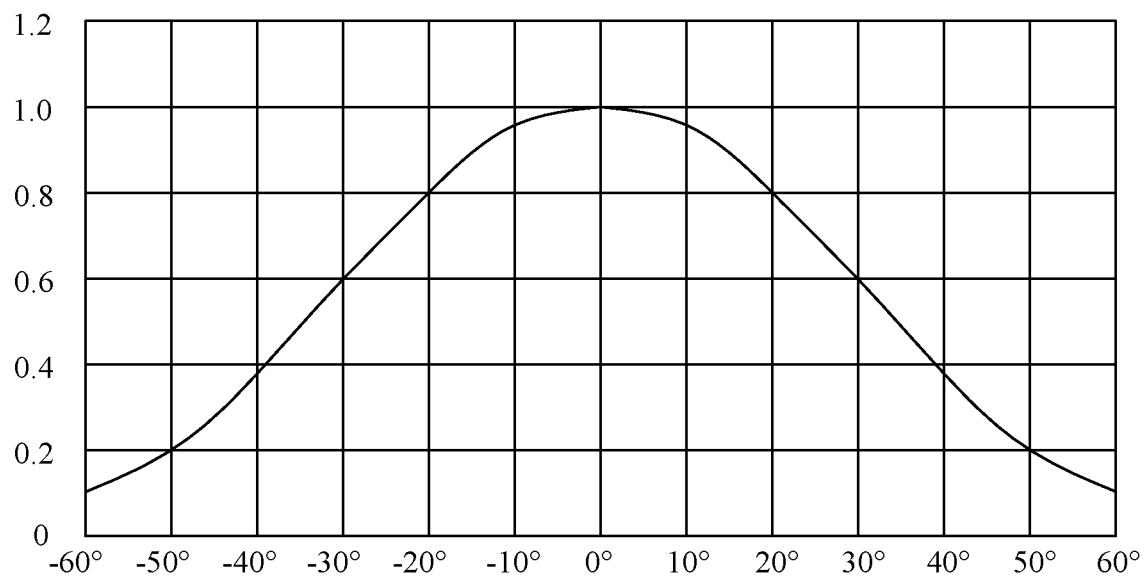
FIG. 8 is a schematic diagram of a possible test result of the experimental structure shown in FIG. 7.

FIG. 8 is a schematic diagram of a possible test result of the experimental structure shown in FIG. 7. In FIG. 8, a horizontal coordinate represents an angle, where a positive number corresponds to an angle α when a light source position moves from P1 to a direction of P2 in FIG. 7, and a negative number corresponds to an angle α when the light source position moves from P1 to a direction of P3 in FIG. 7. A vertical coordinate represents a percentage of the second intensity value to the first intensity value. As shown in FIG. 8, when the angle α is approximately equal to 35°, the percentage of the second intensity value to the first intensity value is 50%, that is, the half-light intensity angle α when the ambient light sensor 7 receives the ambient light through the first ink 21 is approximately 35°.

In this embodiment of this application, the half-light intensity angle α when the ambient light sensor 7 receives the ambient light through the first ink 21 is greater than or equal to 30°, so that an actual sensing effect of the ambient light sensor 7 is not worse than that of a conventional ambient light sensing structure. Specifically:

As shown in FIG. 4, because a distance between the ambient light sensor 7 and the front cover 2 is relatively large, and a width of the light-transmitting gap 10 is relatively narrow, a field of view γ of the ambient light sensor 7 is very small. If the terminal 100 is not provided with the first ink 21, only light within a range of the field of view γ can be received by the ambient light sensor 7 through the light-transmitting gap 10. When a relative position between the terminal 100 and the light source changes relatively small, a sensing value reported by the ambient light sensor 7 easily changes greatly because the field of view γ of the ambient light sensor 7 is relatively small. As a result, when the terminal 100 adjusts light according to the sensing value, brightness of the display screen 4 changes obviously, resulting in poor user experience.

In this embodiment, the first ink 21 is provided, so that the ambient light sensor 7 has the half-light intensity angle α when receiving the ambient light through the first ink 21, and the half-light intensity angle α is far greater than half of the field of view γ. Therefore, ambient light within a larger angle (such as a 2α angle) range can be received by the ambient light sensor 7 through the light-transmitting gap 10, and the sensing range of the ambient light sensor 7 is no longer limited by the field of view γ, so that the ambient light sensor 7 has a better actual sensing effect. It may be understood that, after the first ink 21 is provided, ambient light within a large angle (such as a 2α angle) range is converged by using the first ink 21, and can be received by the ambient light sensor through the light-transmitting gap 10.

It may be understood that, in this embodiment, the ambient light sensor 7 has a device half-light intensity angle β, and the device half-light intensity angle β is a half-light intensity angle of the ambient light sensor 7. Most or all of the light in the light-transmitting gap 10 falls within a range of the device half-light intensity angle β, and is effectively sensed by the ambient light sensor 7. A light receiving plane corresponding to the device half-light intensity angle β is the light sensing surface 71, and a light receiving plane corresponding to the half-light intensity angle α when the ambient light sensor 7 receives the ambient light through the first ink 21 is the first ink 21.

Optionally, the half-light intensity angle α when the ambient light sensor 7 receives the ambient light through the first ink 21 is greater than or equal to 35°, so that the terminal 100 obtains a better sensing effect.

It may also be learned from the experiment shown in FIG. 7 that, in a process in which a spacing S between the first ink 21 and the light sensing surface 71 changes from a relatively small value (for example, 3 mm) to a relatively large value (for example, 30 mm), sensing performance of the ambient light sensor 7 hardly changes. Therefore, when the ambient light sensor 7 receives the ambient light through the first ink 21, a design freedom of the spacing S between the light sensing surface 71 of the ambient light sensor 7 and the first ink 21 is relatively high, so as to be better applicable to different assembly environments of the terminal 100.

For example, as shown in FIG. 4, the spacing between the light sensing surface 71 and the first ink 21 is greater than a thickness of the display panel 4 in a direction perpendicular to the front cover 2. Because the first ink 21 changes a light path direction of light, the first ink 21 can transmit more ambient light to the light-transmitting gap 10, so that the ambient light sensor 7 located on the other side of the light-transmitting gap 10 can sense sufficient ambient light. Therefore, a spacing between the ambient light sensor 7 and the front cover 2 is no longer strictly limited, and the spacing may vary with the thickness of the display panel 4, so that the ambient light sensor 7 is located below the display panel 4.

Referring to FIG. 4, in an optional embodiment, the light sensing surface 71 is close to a packaging edge 72 of the ambient light sensor 7. That is, the ambient light sensor 7 has a device central axis surface 73, and the light sensing surface 71 is located between the packaging edge 72 and the device central axis surface 73. Because the light-transmitting gap 10 is close to the side frame 1, when the light sensing surface 71 is close to the packaging edge 72 of the ambient light sensor 7, that the packaging edge 72 of the ambient light sensor 7 is arranged close to the side frame 1 may meet an assembly requirement, and a layout requirement on the circuit board 6 of the terminal 100 is relatively low, thereby improving the product yield of the terminal 100, and reducing the costs of the terminal 100.

Referring to FIG. 4, in an optional embodiment, a light transmittance of the first ink 21 is greater than or equal to 1%. A higher light transmittance of the first ink 21 indicates a higher resolution of the ambient light sensor 7 for external ambient light. Even if energy of the ambient light is greatly attenuated caused after the ambient light is processed through the first ink 21, the ambient light sensor 7 can still reliably perform sensing, and ambient light intensity corresponding to an electrical signal formed by the ambient light sensor 7 is continuous. In this way backlight brightness of the display panel 4 is continuously adjusted, to improve user experience.

Figure 9:
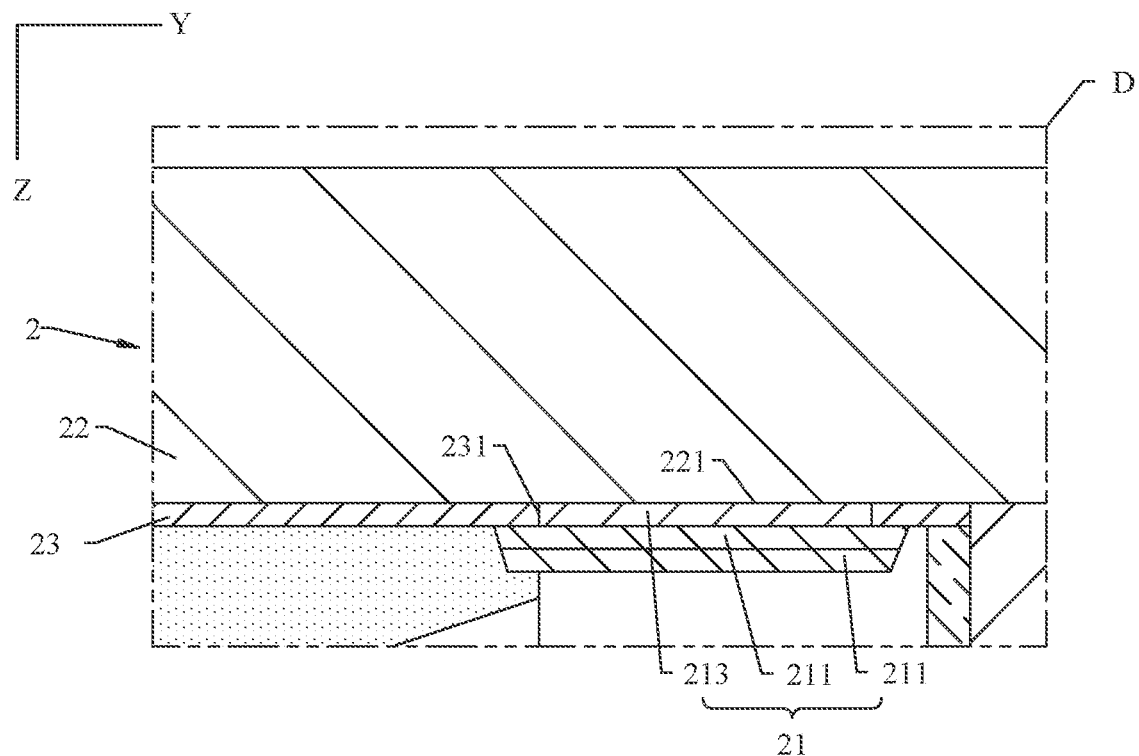
FIG. 9 is an enlarged schematic diagram of a structure at a position D in FIG. 4.
Figure 10:
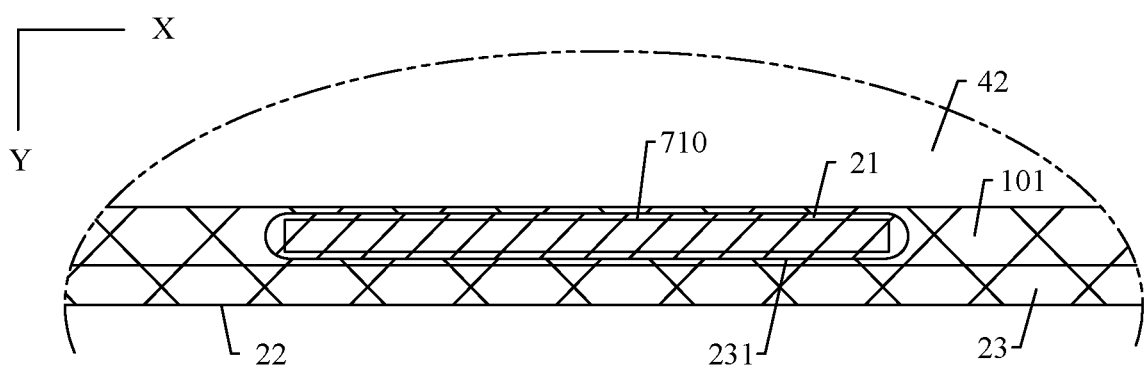
FIG. 10 is a schematic diagram of a relationship between a projection of a partial structure of the terminal shown in FIG. 1A on a front cover and a first ink and a second ink.

Referring to FIG. 9 and FIG. 10 together, FIG. 9 is an enlarged schematic diagram of a structure at a position D in FIG. 4. FIG. 10 is a schematic diagram of a relationship between a projection of a partial structure of the terminal 100 shown in FIG. 1A on a front cover 2 and a first ink 21 and a second ink 23.

In an optional embodiment, the front cover 2 includes a substrate 22, the first ink 21, and the second ink 23. In this embodiment of this application, a projection of a partial structure of the terminal 100 on the front cover 2 may be roughly equivalent to a projection on a surface 221 of the substrate 22 towards the back cover 3.

The second ink 23 is located on the surface 221 of the substrate 22 facing the back cover 3 (referring to FIG. 4). A light transmittance of the second ink 23 is less than the light transmittance of the first ink 21. The second ink 23 is an appearance ink of the front cover 2, and the front cover 2 presents a color of the second ink 23. The second ink 23 plays a role in shielding the light. The second ink 23 is provided with a hollow region 231 facing the light sensing surface 71. The hollow region 231 overlaps the second projection 710.

As shown in FIG. 10, in this embodiment, description is made by using an example in which an area of the hollow region 231 is greater than that of the second projection 710 and fully covers the second projection 710. The first ink 21 covers the hollow region 231. A region covered by a slope line in FIG. 10 corresponds to a region in which the first ink 21 is located. The first ink 21 covers the second projection 710. In this case, an area of which the first ink 21 covers the substrate 22 is greater than that of the second projection 710, so that as much ambient light as possible enters the light-transmitting gap 10 after passing through the first ink 21.

The second ink 23 is disposed around the first ink 21. A region covered by a grid line in FIG. 10 corresponds to a region in which the second ink 23 is located. All remaining parts of the first projection 101 are covered by the second ink 23 except a part facing the hollow region 231. The second ink 23 is disposed around the third projection 42. A region of the surface 221 of the substrate 22 facing the back cover 3 on a side of the first projection 101 away from the third projection 42 (the region surrounds the outside of the first projection 101) may alternatively be covered by the second ink 23.

Figure 11:
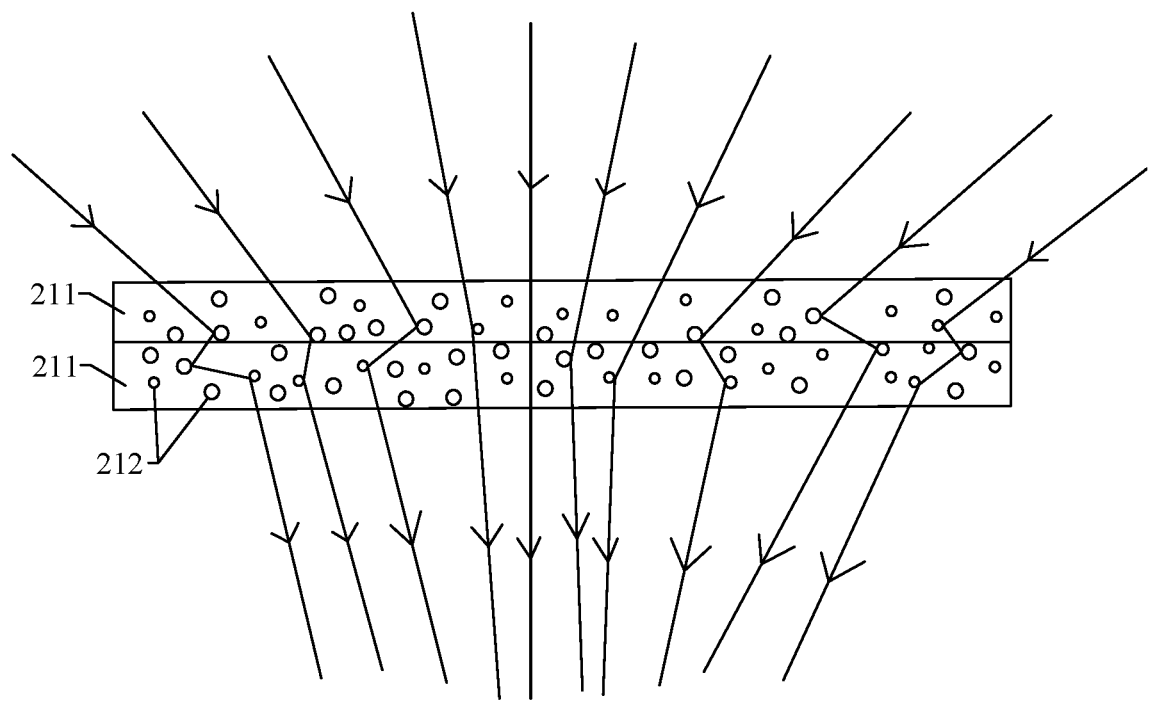
FIG. 11 is a schematic diagram of a light path of light passing through at least two light uniform layers.

Referring to FIG. 9 and FIG. 11 together, FIG. 11 is a schematic diagram of a light path of light passing through at least two light uniform layers 211.

In an optional embodiment, the first ink 21 includes at least two light uniform layers 211 that are stacked. A plurality of diffusion particles 212 are scattered in each light uniform layer 211. Because a plurality of diffusion particles 212 are disposed in the light uniform layer 211, light entering the light uniform layer 211 can achieve a diffusion effect. The at least two light uniform layers 211 may be formed by using a printing and curing cycle process, that is, a cyclic process for printing one light uniform layer, curing the just printed light uniform layer, printing a next light uniform layer, curing the just printed light uniform layer, and so on based on the number of layer. Because the diffusion particles 212 in the light uniform layers 211 are randomly distributed in a space, the diffusion particles 212 in the light uniform layers 211 of different layers can generate a stacked structure in a three-dimensional space by cyclic printing and curing, to finally ensure that all incident light with a larger angle may diffuse, through the diffusion particles 212 in the first ink 21, to a degree acceptable by the ambient light sensor 7.

Particles of different diameters may exist in the plurality of diffusion particles 212. A particle size range of the diffusion particles 212 is 50 nanometers (nm) to 100 micrometers (μm). Materials of the diffusion particles 212 are not limited to titanium oxide, polymethyl methacrylate, silicon dioxide, metal ions, and the like.

Referring to FIG. 9, in an optional embodiment, the first ink 21 further includes a color layer 213. The color layer 213 is located between the at least two light uniform layers 211 and the substrate 22. A color of the color layer 213 is the same as a color of the second ink 23. A light transmittance of the color layer 213 is greater than a light transmittance of the second ink 23. Because the color of the color layer 213 is the same as the color of the second ink 23, the first ink 21 is the same as the second ink 23 in appearance, to ensure a hide effect in the appearance. The light transmittance of the color layer 213 is greater than the light transmittance of the second ink 23, so that ambient light can enter the first ink 21.

A coating process of the color layer 213 may be a screen printing or the like.

The color of the second ink 23 may be black. In this case, the color of the color layer 213 may alternatively be black. However, because the color layer 213 has a relatively high light transmittance, the color layer 213 generally presents a transparent black color. The color of the color layer 213 may alternatively vary with the color of the second ink 23, for example, blue, pink, red, purple, or white.

Referring to FIG. 4, in an optional embodiment, sensitivity of the ambient light sensor 7 is less than or equal to 0.0012 Lux/count. The ambient light sensor 7 with high sensitivity is used in this application. High sensitivity refers to measurement of a response of a single device to external light intensity and a resolution capability of an analog-to-digital converter (ADC) of the sensor. The sensitivity "Lux/count" means that: a unit of the external light intensity is lux, and output values of the analog-to-digital converter are dimensionless count values, for example, 1, 2, 3, and so on. That is, stronger light intensity indicates a larger output value (corresponding to the electrical signal described above) of the device analog-to-digital converter. The sensitivity of the ambient light sensor in this application may be less than or equal to 0.0012 Lux/count, an integration time is 100 milliseconds (ms), and smaller sensitivity specification data is better.

In this embodiment, even if the intensity of the ambient light passing through the first ink 21 attenuates seriously, but the sensitivity of the ambient light sensor 7 is high enough to reliably sense the ambient light intensity of the environment in which the terminal 100 is located, and the sensing performance is level with or even surpasses the sensing performance of a conventional ambient light sensing solution, so that not only a full screen design requirement of the terminal 100 is met, but also a sensing requirement of the ambient light intensity can be met.

Figure 12:
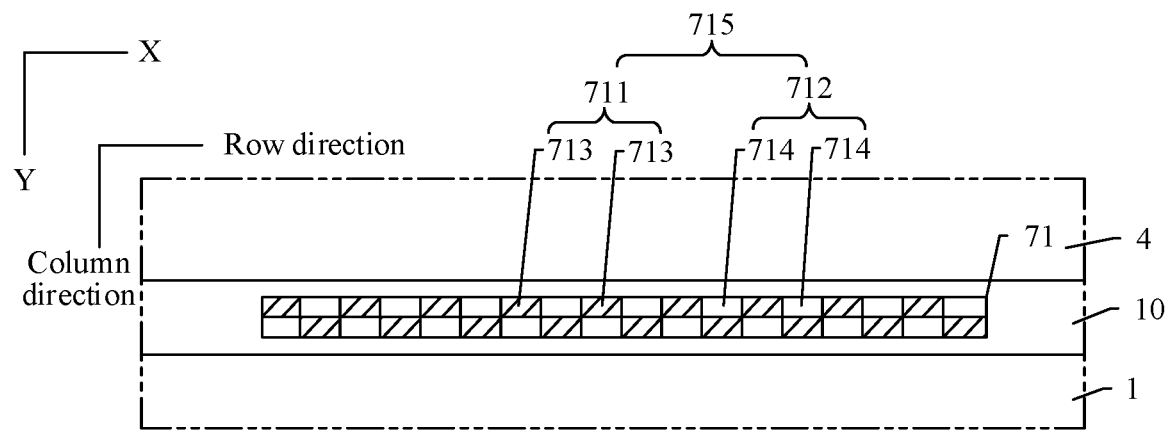
FIG. 12 is a schematic diagram of a position relationship between a light sensing surface, a display panel, and a side frame in FIG. 4.

Referring to FIG. 5 to FIG. 12 together, FIG. 12 is a schematic diagram of a position relationship between a light sensing surface 71, a display panel 4, and a side frame 1 in FIG. 4.

In an optional embodiment, the light sensing surface 71 includes a first light sensing channel 711 and a second light sensing channel 712. The first light sensing channel 711 includes a plurality of first light sensing units 713 (a part covered by a slope line in FIG. 12). The second light sensing channel 712 includes a plurality of second light sensing units 714 (a space part in FIG. 12). The plurality of first light sensing units 713 and the plurality of second light sensing units 714 jointly form a light sensing unit array 715. A row direction and a column direction of the light sensing unit array 715 are perpendicular to each other. The first light sensing units 713 and the second light sensing units 714 are alternately arranged in a row direction and a column direction of the light sensing unit array 715. The row direction or the column direction of the light sensing unit array 715 is the same as an extending direction of the first projection 101.

Because the light-transmitting gap 10 is disposed around the display panel 4, the light-transmitting gap 10 may be generally in a rectangular frame shape, there are a plurality of extending directions of the first projection 101. For example, the first projection 101 includes two oppositely disposed transverse portions 1011 and two oppositely disposed longitudinal portions 1012 located between the two transverse portions 1011. An extending direction of the transverse portion 1011 is parallel to the width direction X of the terminal 100, and an extending direction of the longitudinal portion 1012 is parallel to the length direction Y of the terminal 100. The row direction of the light sensing unit array 715 is the same as the extending direction of the transverse portion 1011 or the longitudinal portion 1012 that overlaps the second projection 710. Alternatively, the column direction of the light sensing unit array 715 is the same as the extending direction of the transverse portion 1011 or the longitudinal portion 1012 that overlaps the second projection 710.

For example, in this embodiment, the ambient light sensor 7 is disposed at the bottom of the terminal 100, and the second projection 710 overlaps the transverse portion 1011 of the first projection 101 located at the bottom of the terminal 100. The row direction of the light sensing unit array 715 is the same as the extending direction of the first projection 101, that is, the row direction of the light sensing unit array 715 is the same as the width direction X of the terminal 100, and the column direction of the light sensing array unit 715 is the same as the length direction Y of the terminal 100. In another embodiment, when the second projection 710 overlaps the longitudinal portion 1012 of the first projection 101 located on the left side portion or the right side portion of the terminal 100, the column direction of the light sensing unit array 715 is the same as the extending direction of the first projection 101, that is, the column direction of the light sensing unit array 715 is the same as the length direction Y of the terminal 100, and the row direction of the light sensing array unit 715 is the same as the width direction X of the terminal 100. In this embodiment, the row direction of the light sensing array unit 715 is defined as a direction in which a relatively small included angle is formed with the width direction X of the terminal, and the column direction of the light sensing array unit 715 is defined as a direction in which a relatively large included angle is formed with the width direction X of the terminal. In another embodiment, the row direction and the column direction of the light sensing array unit 715 may be adjustable.

In this embodiment of this application, the electrical signal of the ambient light sensor 7 is formed according to a condition of light received by the first light sensing channel 711 and the second light sensing channel 712. Therefore, ambient light needs to evenly enter the first light sensing channel 711 and the second light sensing channel 712. The row direction or the column direction is the same as the extending direction of the first projection 101, and the first light sensing unit 713 and the second light sensing unit 714 are alternately arranged in the row direction or the column direction. Therefore, regardless of how conditions of the light-transmitting gap 10 change (for example, a change caused due to manufacturing or assembly tolerances), actual effective areas of the first light sensing channel 711 and the second light sensing channel 712 for receiving the ambient light vary linearly. That is, both equally increase or decrease simultaneously, so that the ambient light sensor 7 can reliably sense the light intensity of the environment in which the terminal 100 is located.

Optionally, the row direction of the light sensing unit array 715 is the same as the extending direction (for example, the width direction X of the terminal 100) of the first projection 101. In the light sensing unit array 715, a total quantity of first light sensing units 713 and second light sensing units 714 that are located in a same row is greater than a total quantity of first light sensing units 713 and second light sensing units 714 that are located in a same column.

In this embodiment, the light sensing unit array 715 is generally in a long strip shape, and a long side is parallel to the extending direction of the first projection 101. That is, the light sensing unit array 715 is generally in a form parallel to the first projection 101, so that more light sensing units may be arranged in the light sensing unit array 715, and the actual effective area of the light sensing surface 71 is larger, thereby improving a sensing capability and reliability of the ambient light sensor 7.

In another embodiment, the column direction of the light sensing unit array 715 is the same as the extending direction (for example, the length direction Y of the terminal 100) of the first projection 101. In this case, the second projection 710 formed by the light sensing surface 71 on the front cover 2 may overlap the longitudinal portion 1012 of the first projection 101 located on the left side portion or the right side portion of the terminal 100. In the light sensing unit array 715, a total quantity of first light sensing units 713 and second light sensing units 714 that are located in a same column is greater than a total quantity of first light sensing units 713 and second light sensing units 714 that are located in a same row.

In another embodiment, the light sensing surface 71 may alternatively include a larger quantity of light sensing channels. In different gap conditions, actual effective areas of the light sensing channels for receiving the ambient light are equal or almost equal.

Figure 13:
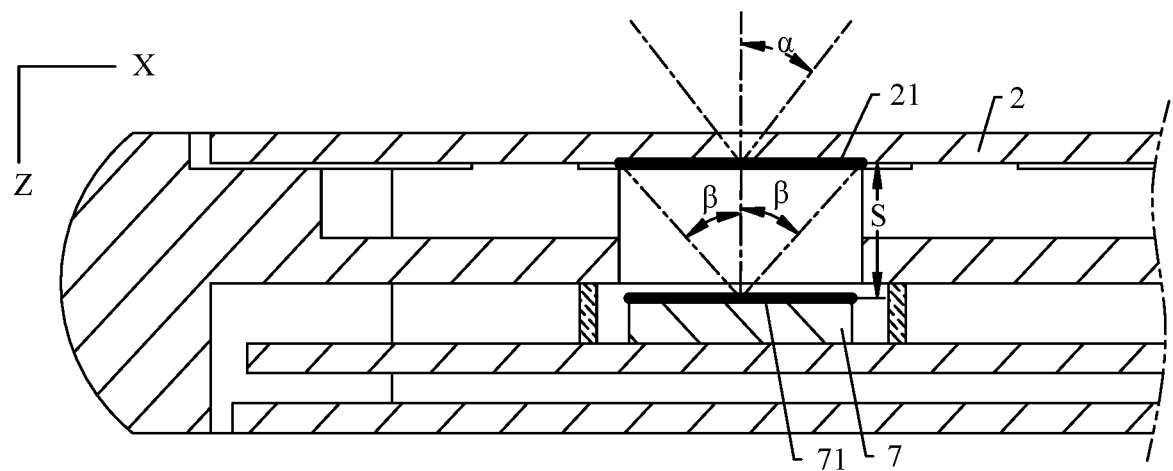
FIG. 13 is a cross-sectional view of a partial structure of the terminal along a line E-E shown in FIG. 1A.

Referring to FIG. 4 and FIG. 13 together, FIG. 13 is a cross-sectional view of a partial structure of the terminal 100 along a line E-E shown in FIG. 1A.

In an optional embodiment, in the extending direction of the first projection 101 (in this embodiment, the width direction X of the terminal 100), a size of the first ink 21 is greater than or equal to 2×S×tan β, S is a spacing between the front cover 2 and the light sensing surface 71, and β is a device half-light intensity angle of the ambient light sensor 7. The device half-light intensity angle β is a half-light intensity angle of the ambient light sensor 7.

In this embodiment, in a vertical direction (that is, the length direction Y of the terminal 100) of the extending direction of the first projection 101, the size of the first ink 21 may be roughly equal to a size of the second projection 710. In the extending direction of the first projection 101 (that is, the width direction X of the terminal 100), the size of the first ink 21 varies with the device half-light intensity angle β of the ambient light sensor 7 and the spacing between the light sensing surface 71 and the front cover 2. In this case, the first ink 21 is generally in a long strip shape, and more ambient light can enter the ambient light sensor 7 through the first ink 21.

Figure 14:
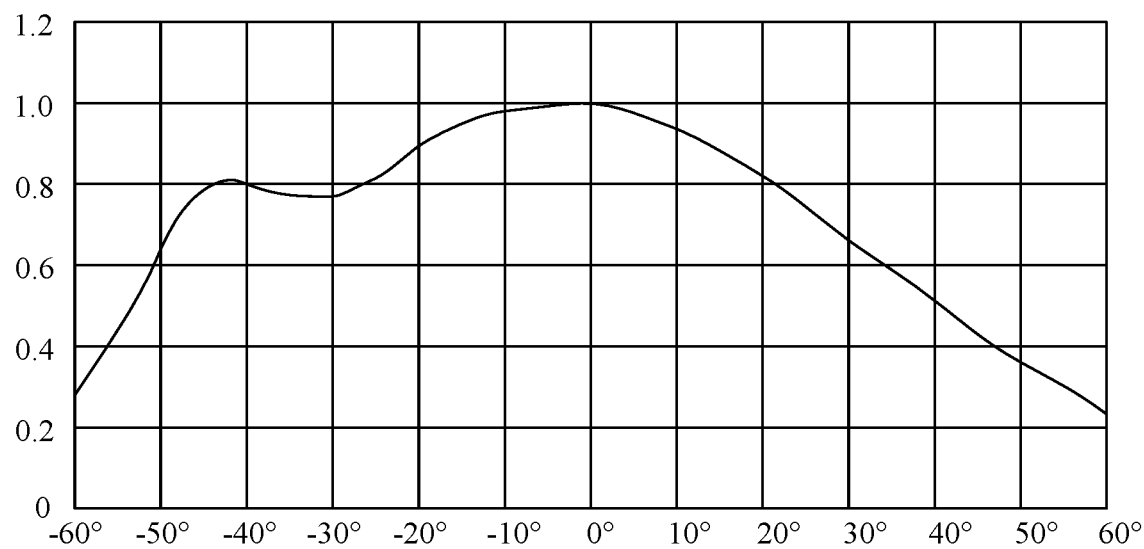
FIG. 14 is a first schematic diagram of a possible test result of the terminal shown in FIG. 1A in an ambient light intensity test.
Figure 15:
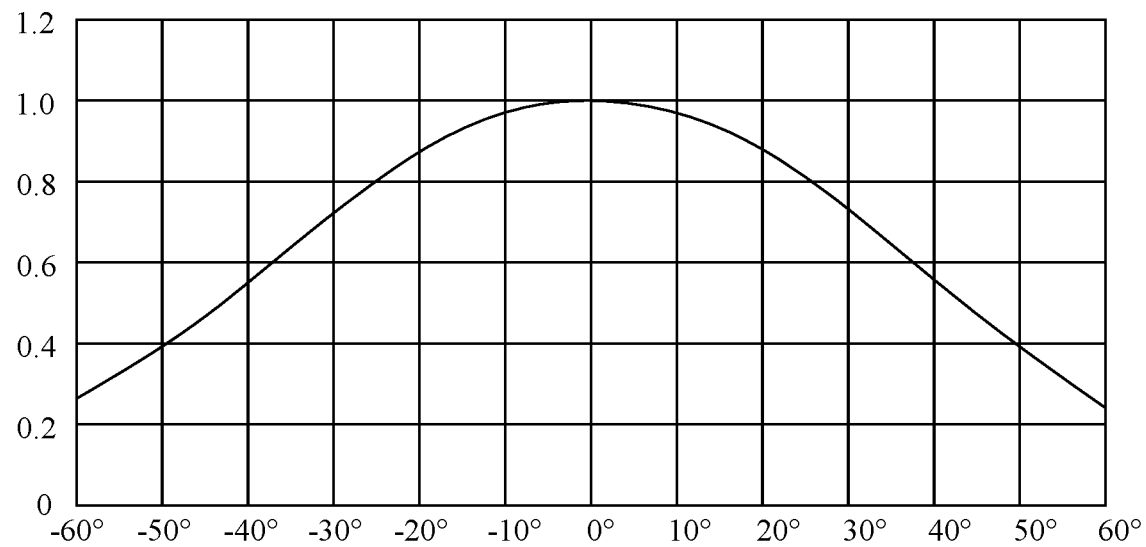
FIG. 15 is a second schematic diagram of a possible test result of the terminal shown in FIG. 1A in an ambient light intensity test.

Referring to FIG. 14 and FIG. 15 together, FIG. 14 is a first schematic diagram of a possible test result of the terminal 100 shown in FIG. 1A in an ambient light intensity test. FIG. 15 is a second schematic diagram of a possible test result of the terminal 100 shown in FIG. 1A in an ambient light intensity test.

In FIG. 14, a horizontal coordinate represents an angle, an angle of the horizontal coordinate corresponds to an angle of the ambient light in FIG. 4 relative to the first ink 21 in the length direction Y, and the angle is located in a YZ plane, and includes a in the YZ plane; and a vertical coordinate represents a ratio of an actual sensing value to a facing sensing value (the light source is located right above). In FIG. 15, a horizontal coordinate represents an angle, an angle of the horizontal coordinate corresponds to an angle of the ambient light in FIG. 13 relative to the first ink 21 in the width direction X, and the angle is located in an XZ plane, and includes a in the XZ plane; and a vertical coordinate represents a ratio of an actual sensing value to a facing sensing value (the light source is located right above). As shown in FIG. 14 and FIG. 15, in the terminal 100 of this application, the half-light intensity angle α when the ambient light sensor 7 receives the ambient light through the first ink 21 is greater than 40°.

Figure 16:
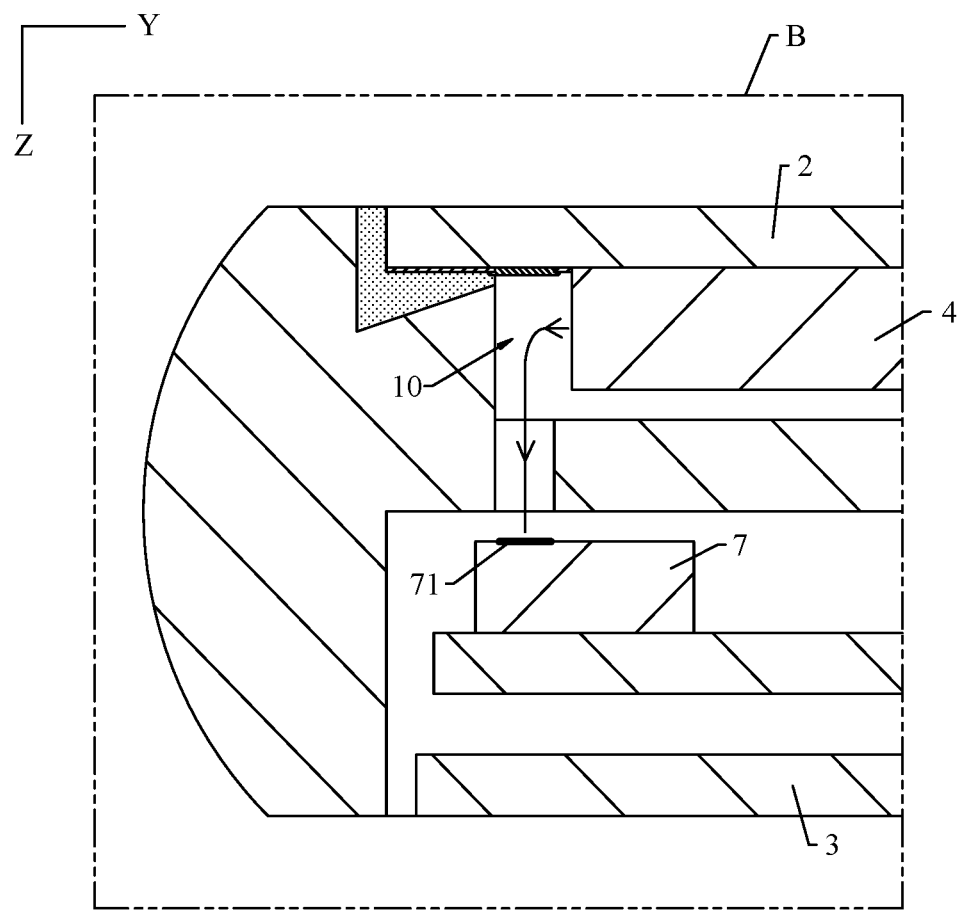
FIG. 16 is an enlarged schematic diagram of a structure at a position B in FIG. 3 in another implementation.

Referring to FIG. 4 and FIG. 16 together, FIG. 16 is an enlarged schematic diagram of a structure at a position B in FIG. 3 in another implementation.

In this embodiment of this application, because the sensitivity of the ambient light sensor 7 is extremely high, a degree of tolerance of the ambient light sensor 7 to a light leakage phenomenon on a side surface of the display panel 4 needs to be considered.

In the implementation shown in FIG. 16, the light of the display panel 4 may leak into the light-transmitting gap 10 through the side surface. However, because the spacing between the light sensing surface 71 of the ambient light sensor 7 and the front cover 2 is large, and the ambient light sensor 7 is located between the display panel 4 and the back cover 3, a path of light leaked from the side surface of the display panel 4 to the light sensing surface 71 is abnormally twisted, and energy attenuation caused by light path changes such as refraction and reflection in a light transmission process is significant. Therefore, the light leaked from the side surface of the display panel 4 has little or even little impact on a sensing result of the ambient light sensor 7, the ambient light sensor 7 has relatively high tolerance to the brightness of the display panel 4, and a signal-to-noise ratio is relatively high.

In the implementation shown in FIG. 4, the terminal 100 may further include a light shielding member 92. The light shielding member 92 is located between the outer peripheral side 41 of the display panel 4 and the inner peripheral side 11 of the side frame 1, and covers the outer peripheral side 41 of the display panel 4. The light shielding member 92 is configured to shield light of the display panel 4, to reduce a risk of sensing distortion of the ambient light sensor 7 caused by light leakage of the display panel 4.

The light shielding member 92 may be a housing part of the terminal 100, or may be an additional structural member that uses an opaque material, or may be another structure that may shield light inside the terminal 100.

The terminal 100 may further include a light blocking member 93. The light blocking member 93 is disposed on the circuit board 6, and is disposed around the ambient light sensor 7. The light blocking member 93 can reduce an adverse impact of another light emitting device in the terminal 100 on the sensing result of the ambient light sensor 7.

In this embodiment of this application, the terminal 100 satisfies that, when the brightness of the display panel 4 is the highest, and the environment in which the terminal 100 is located is all dark, light intensity corresponding to the electrical signal emitted by the ambient light sensor 7 is less than or equal to 20 lux. When the brightness of the display panel 4 is the lowest and the environment in which the terminal 100 is located is all dark, light intensity corresponding to the electric signal emitted by the ambient light sensor 7 is less than or equal to 5 lux.

When the terminal 100 enables the function of automatically adjusting the brightness of the display panel 4, the brightness of the display panel 4 reaches the highest only when external ambient light intensity needs to generally reach 3000 lux. When the brightness of the display panel 4 is the highest and the environment in which the terminal 100 is located is all dark, light intensity corresponding to the electric signal emitted by the ambient light sensor 7 is less than or equal to 20 lux, and a ratio of a value of 20 lux to the ambient light intensity is very small. Therefore, the ambient light sensor 7 is affected by light leakage on the side surface of the display panel 4 and does not cause dimming problems.

If an actual illuminance in an external environment is from relatively high to relatively low (for example, from 5000 lux to 50 lux), the display panel 4 is adjusted to be dark accordingly because the environment becomes dark. In this case, the light leakage phenomenon on the side surface of the display panel 4 has less impact on the ambient light sensor 7. In this way, a positive feedback process of adjusting the display panel 4 to be dark is formed.

In an extreme case, for example, if the external ambient light directly changes to 0 lux, the ambient light becomes dark, and the display panel 4 becomes dark synchronously. The impact of the light leakage phenomenon on the side surface of the display panel 4 on the ambient light sensor 7 is further reduced. After a short period of adjustment time, the display panel 4 may finally reach the lowest brightness, and a final effect is only that a time of reaching the lowest brightness is longer.

When the brightness of the display panel 4 is the lowest, the environment in which the terminal 100 is located is all dark, and the light intensity corresponding to the electrical signal emitted by the ambient light sensor 7 is not equal to 0 (for example, the light intensity is equal to 5 lux), a problem that the brightness of the display panel 4 cannot be adjusted to be the lowest in a dark environment may occur. In this case, dark field calibration may be used to overcome this problem. For example, the terminal 100 is placed in a dark and no light dark field environment, the backlight of the display panel 4 is set to the darkest, a dark field value with a highest appearance probability of a read value of the ambient light sensor 7 is read in a period of time, the value is stored in a fixed storage region (for example, a memory) of the terminal 100. Subsequently, when the function of the ambient light sensor 7 is used, the dark field value is subtracted from the read value of the ambient light sensor 7, and then is reported, thereby achieving an effect of forcibly reporting 0.

Figure 17:
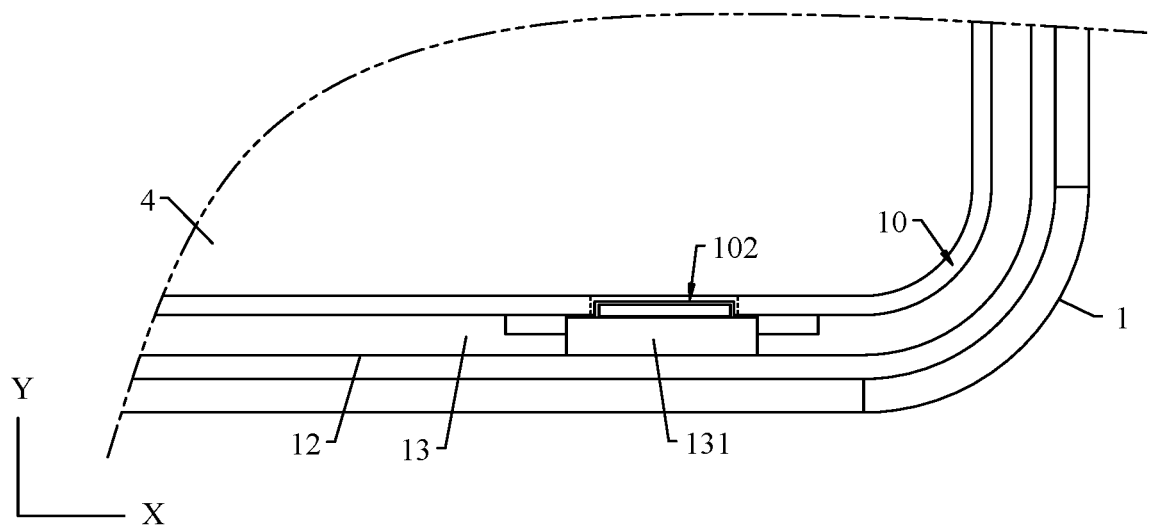
FIG. 17 is a schematic diagram of a partial structure of the terminal shown in FIG. 1A.
Figure 18:
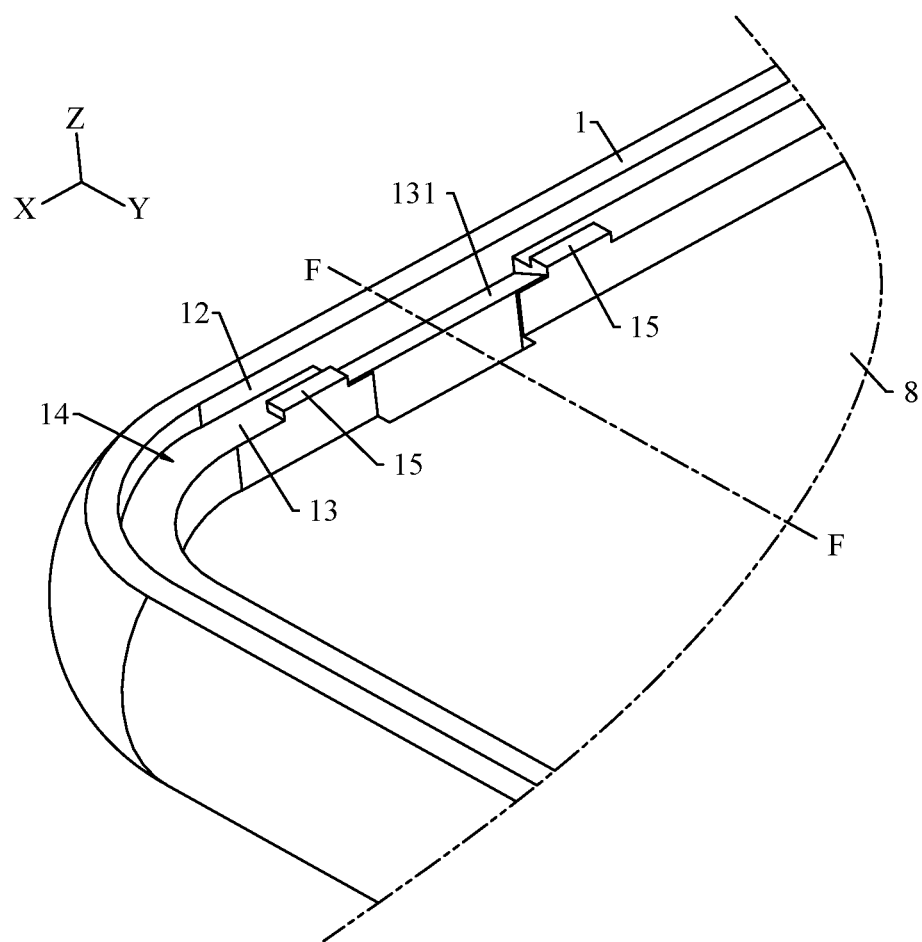
FIG. 18 is a schematic structural diagram of the side frame and the middle panel shown in FIG. 2 at another angle.
Figure 19:
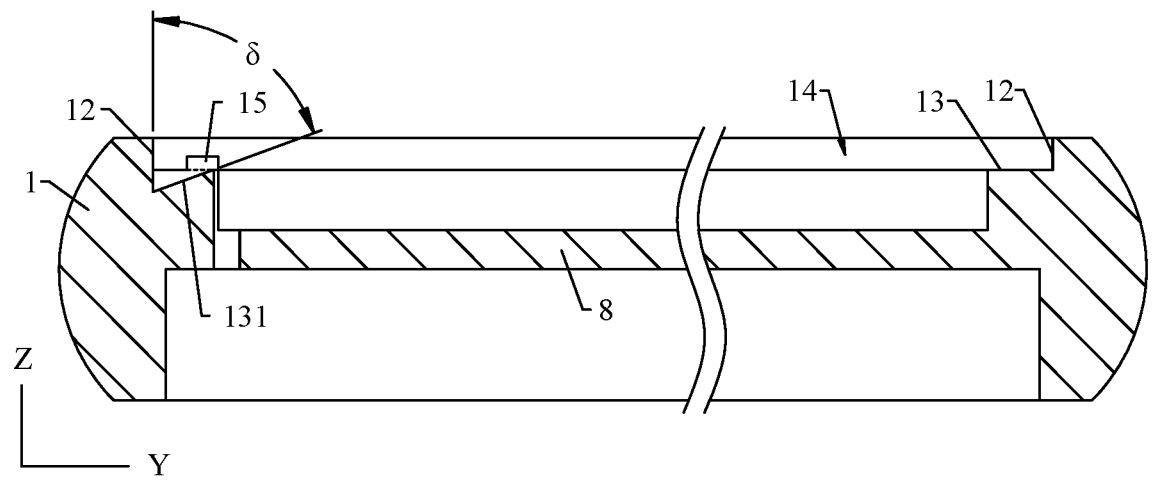
FIG. 19 is a cross-sectional view of a structure along a line F-F in FIG. 18.

Referring to FIG. 4, and FIG. 17 to FIG. 19 together, FIG. 17 is a schematic diagram of a partial structure of the terminal 100 shown in FIG. 1A. FIG. 18 is a schematic structural diagram of the side frame 1 and the middle panel 8 shown in FIG. 2 at another angle. FIG. 19 is a cross-sectional view of a structure along a line F-F in FIG. 18. The structure shown in FIG. 17 hides the front cover 2 of the terminal 100.

In an optional embodiment, the side frame 1 has a limiting surface 12 and a supporting surface 13 connected to the limiting surface 12. The limiting surface 12 encloses and forms a mounting space 14. The front cover 2 is partially or fully accommodated in the mounting space 14. The front cover 2 includes a bottom surface 24 and a side surface 25 connected to an edge of the bottom surface 24. The bottom surface 24 is fixedly connected to the supporting surface 13 by using an adhesive layer 20. The bottom surface 24 is roughly parallel to the supporting surface 13. The side surface 25 faces the limiting surface 12. The limiting surface 12 roughly stands sideways relative to the supporting surface 13.

The adhesive layer 20 may be formed by using a double-sided adhesive or dispensing adhesive.

Optionally, the light-transmitting gap 10 includes a light sensing portion 102 facing the light sensing surface 71. The supporting surface 13 includes an inclined portion 131. The inclined portion 131 is located between the limiting surface 12 and the light sensing portion 102. An acute angle δ is formed between the inclined portion 131 and the limiting surface 12. The acute angle δ is less than or equal to 60°, for example, 45°, 50°, 55°, or 60°. The adhesive layer 20 is formed by curing liquid glue.

In this embodiment, the inclined portion 131 is disposed close to the light sensing portion 102. Because the acute angle δ is formed between the inclined portion 131 and the limiting surface 12, when the liquid glue is coated on the supporting surface 13, the inclined portion 131 can enable the glue to flow in a direction away from the light sensing portion 102, and the glue located on the inclined portion 131 is prevented from overflowing and entering the light sensing portion 102, to avoid overflow glue in the adhesive layer 20 that shields the ambient light sensor 7 from receiving the optical path, thereby improving the product yield of the terminal 100.

In an extending direction of the light-transmitting gap 10, a length of the inclined portion 131 is greater than a length of the light sensing portion 102. In this case, a risk of overflowing glue from the adhesive layer 20 into the light sensing portion 102 is lower.

Optionally, the side frame 1 includes at least two supporting platforms 15 protruding from the supporting surface 13. The at least two supporting platforms 15 are located on two sides of the inclined portion 131 respectively. In this embodiment, when the front cover 2 is fastened to the side frame 1, the supporting platform 15 can support the front cover 2, thereby ensuring an adhesion effect of the adhesive layer 20. In addition, a case that when the liquid glue is not cured, a large quantity of glue penetrates into the light sensing portion 102 of the light-transmitting gap 10 caused by excessively pressing the liquid glue is avoided, thereby improving the product yield of the terminal 100.

Optionally, as shown in FIG. 4, a gap is formed between the side surface 25 and the limiting surface 12. The gap is filled with an adhesive member 30. The adhesive member 30 and the adhesive layer 20 are integrally cured and formed by using liquid transparent glue. The ambient light can enter the light-transmitting gap 10 after undergoing a plurality of times of optical path changes in the adhesive member 30 and the adhesive layer 20.

In this embodiment, because the ambient light can enter the light-transmitting gap after undergoing the plurality of times of optical path changes in the adhesive member 30 and the adhesive layer 20, the ambient light may enter the ambient light sensor 7 through the front cover 2 and the first ink 21, or may enter the ambient light sensor 7 through the adhesive member 30 in the gap, so that the ambient light sensor 7 can receive more ambient light, thereby improving the sensing performance of the ambient light sensor 7.

The adhesive member 30 and the adhesive layer 20 formed after the liquid transparent glue is cured are generally white in appearance, and have specific light diffusion performance.

Optionally, a plurality of diffusion particles are scattered in the adhesive member and the adhesive layer 20. Particles of different diameters may exist in the plurality of diffusion particles. A particle size range of the diffusion particles is 50 nanometers (nm) to 100 micrometers (μm). Materials of the diffusion particles are not limited to titanium oxide, polymethyl methacrylate, silicon dioxide, metal ions, and the like. The plurality of diffusion particles help improve the light diffusion performance of the adhesive member 30 and the adhesive layer 20.

Figure 20:
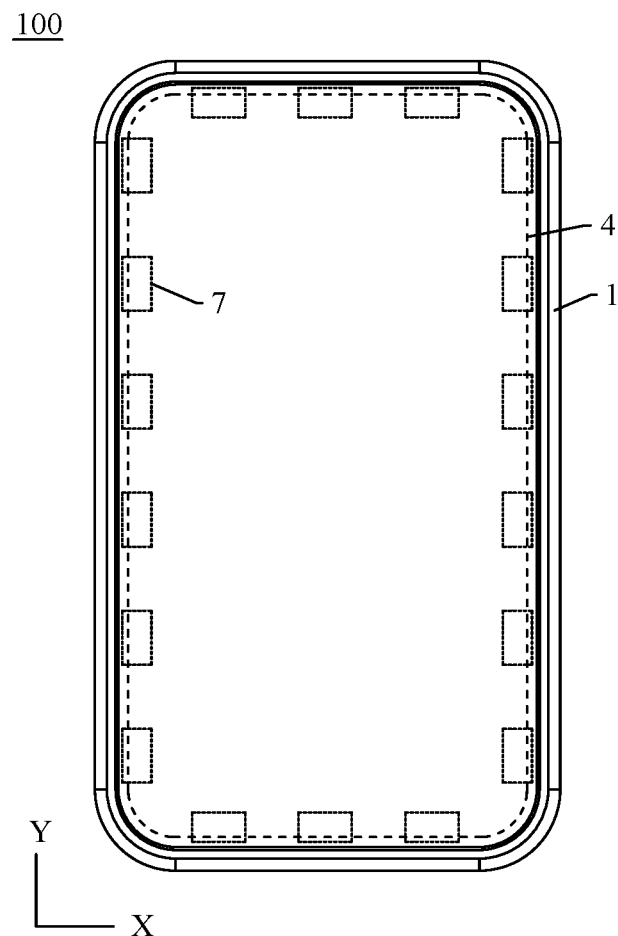
FIG. 20 is a schematic structural diagram of a terminal according to still another embodiment of this application.
Figure 21:
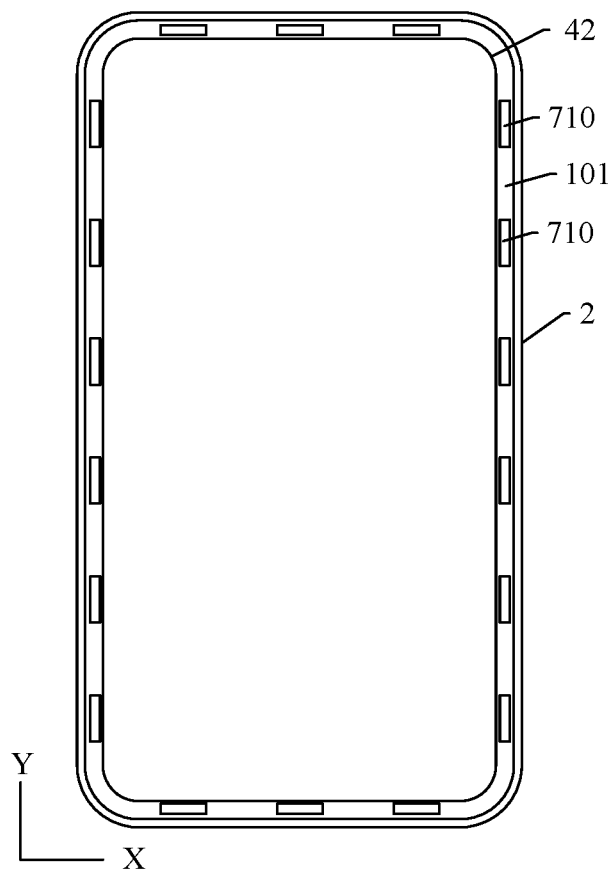
FIG. 21 is a schematic diagram of a projection of a partial structure of the terminal shown in FIG. 20 on a front cover.

Referring to FIG. 20 and FIG. 21 together, FIG. 20 is a schematic structural diagram of a terminal 100 according to still another embodiment of this application. FIG. 21 is a schematic diagram of a projection of a partial structure of the terminal 100 shown in FIG. 20 on a front cover 2. Most technical solutions in this embodiment that are the same as those in the foregoing embodiments are not described again.

In an optional embodiment, there are at least two ambient light sensors 7. Light sensing surfaces of the at least two ambient light sensors 7 form at least two second projections 710 spaced from each other on the front cover 2. In this case, the ambient light sensors 7 are arranged at different positions, and can receive ambient light from different positions of the front cover 2, and cooperative work of the at least two ambient light sensors 7 helps improve accuracy of sensing ambient light intensity by the terminal 100.

The display panel 4 forms a third projection 42 on the front cover 2. An outer peripheral side of the display panel 4 and an inner peripheral side of the side frame 1 are disposed opposite to each other and form a light-transmitting gap therebetween. The light-transmitting gap forms a first projection 101 on the front cover 2. The first projection 101 continuously surrounds a periphery of the third projection 42. The at least two second projections 710 are arranged at intervals in an extending direction of the first projection 101. That is, the at least two second projections 710 are distributed at different positions of the first projection 101 at intervals in the extending direction of the first projection 101. In an implementation, the at least two second projections 710 are arranged at equal intervals. In another implementation, the at least two second projections 710 are randomly distributed.

In this embodiment, a shape of the first projection 101 varies with a contour of the third projection 42. The at least two second projections 710 may be at any position of the first projection 101, that is, the at least two second projections 710 has a plurality of position arrangement relationships relative to the third projection 42. For example, the at least two second projections 710 may be located on the same side of the third projection 42, or may be located on different sides of the third projection 42, or may be evenly distributed around the third projection 42.

Optionally, the position of the first ink 21 varies with the position of the second projection 710. The first ink 21 covering the second projection 710 may be located at any position of the first projection 101, that is, at any position around the display panel 4.

Figure 22:
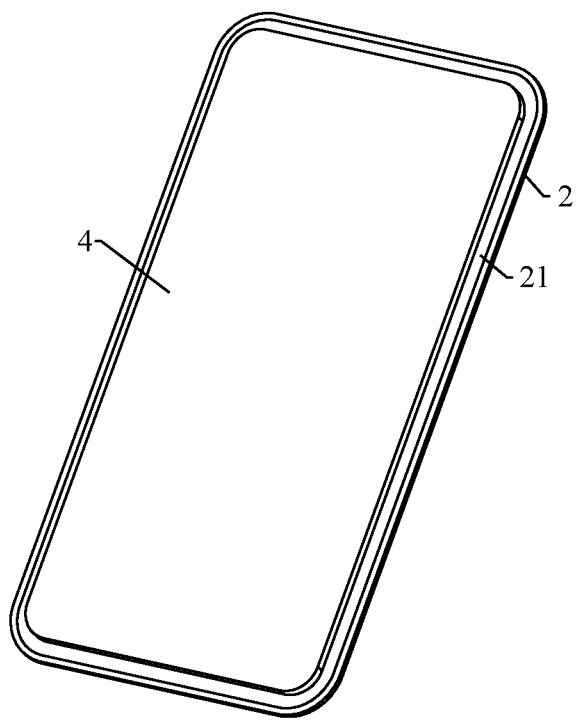
FIG. 22 is a schematic structural diagram of an assembly structure of a front cover and a display panel of the terminal shown in FIG. 20 in an implementation.

Referring to FIG. 21 and FIG. 22 together, FIG. 22 is a schematic structural diagram of an assembly structure of a front cover 2 and a display panel 4 of the terminal 100 shown in FIG. 20 in an implementation.

There is one first ink 21, and the first ink 21 covers all the at least two second projections 710. For example, if the first ink 21 continuously covers the first projection 101, the first ink 21 covers all the at least two second projections 710. In this case, the first ink 21 is continuously disposed around the display panel 4. In another embodiment, the first ink 21 may alternatively cover a part of the first projection 101, and covers all the at least two second projections 710.

Figure 23:
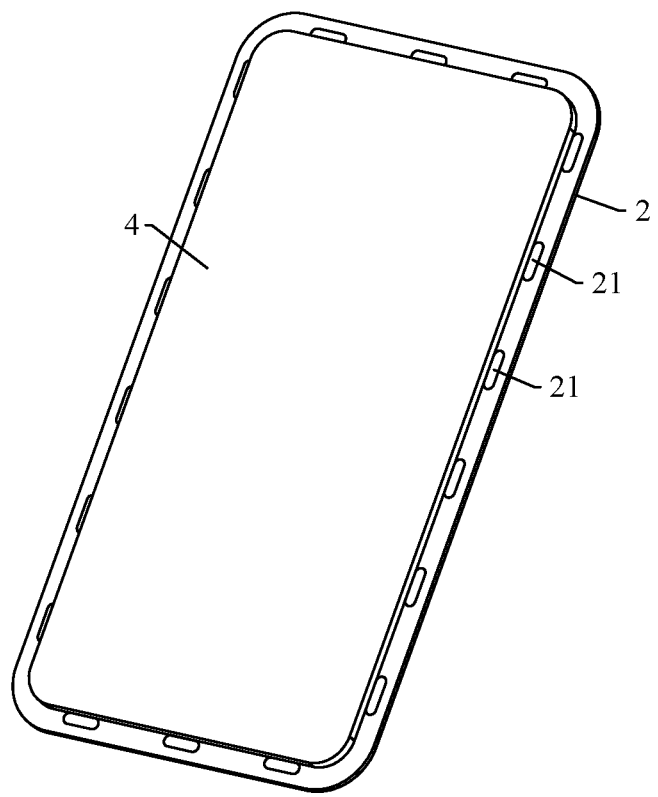
FIG. 23 is a schematic structural diagram of an assembly structure of a front cover and a display panel of the terminal shown in FIG. 20 in another implementation.

Referring to FIG. 21 and FIG. 23 together, FIG. 23 is a schematic structural diagram of an assembly structure of a front cover 2 and a display panel 4 of the terminal 100 shown in FIG. 20 in another implementation.

There are at least two first inks 21, and the at least two first inks 21 cover the at least two second projections 710 in a one-to-one correspondence. In other words, different second projections 710 are covered by different first inks 21. When the colors of the second ink 23 include a plurality of colors, colors of the color layers 213 of the at least two first inks 21 vary with the colors of the second ink 23 that are similar to the colors of the color layers.

Figure 24:
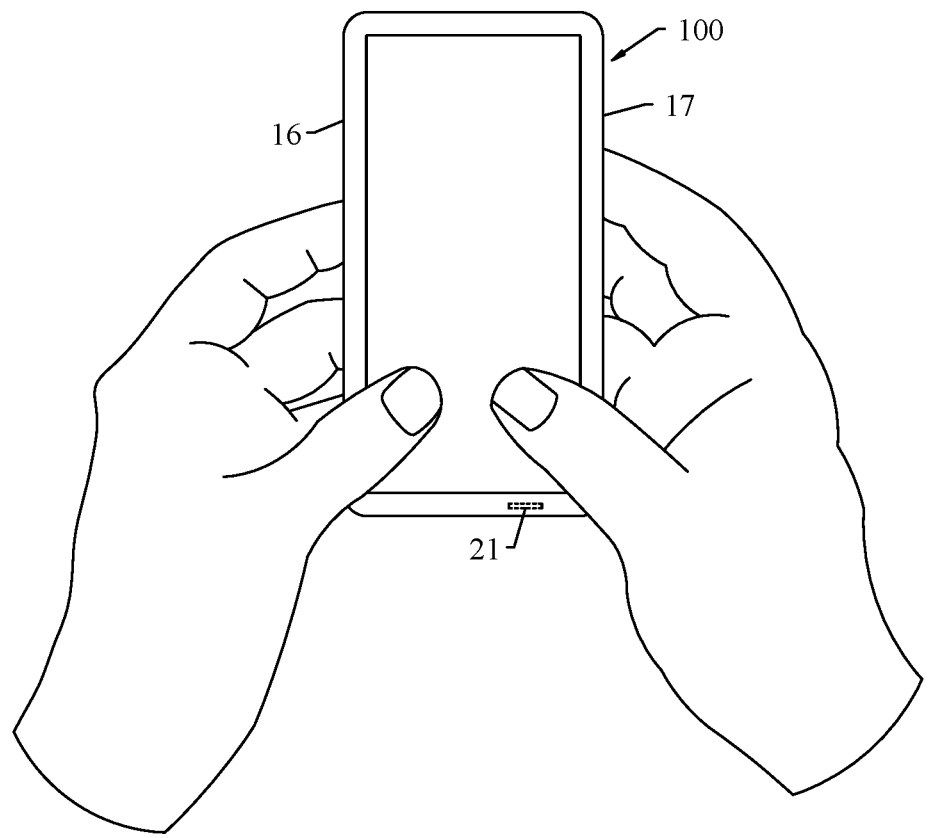
FIG. 24 is a schematic structural diagram of the terminal shown in FIG. 1A in a use state.
Figure 25:
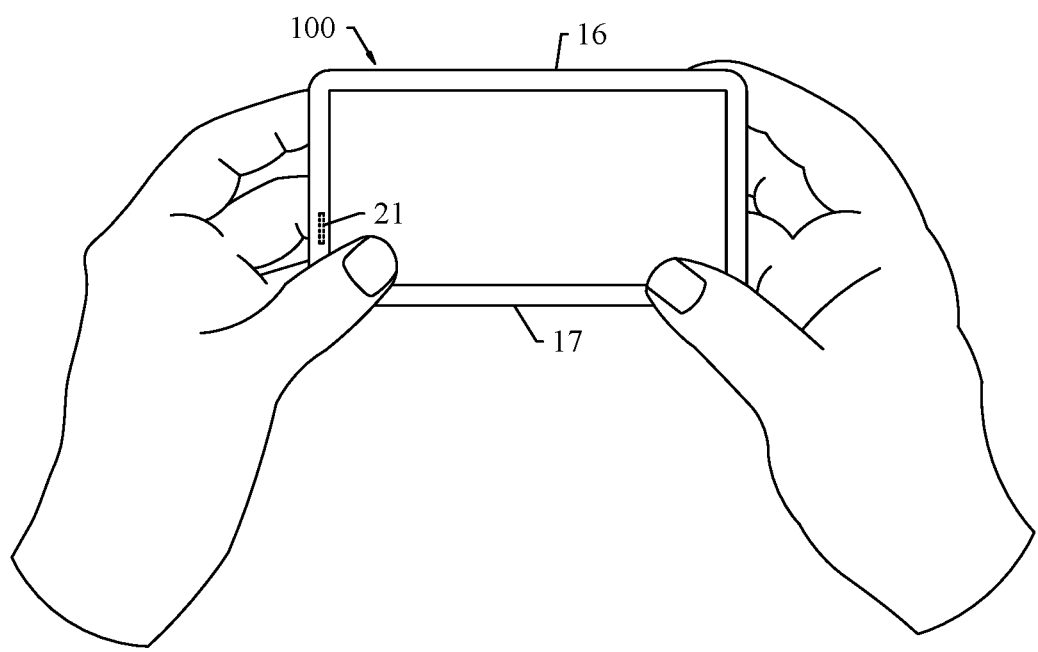
FIG. 25 is a schematic structural diagram of the terminal shown in FIG. 1A in another use state.

Referring to FIG. 1A, FIG. 24, and FIG. 25 together, FIG. 24 is a schematic structural diagram of the terminal 100 shown in FIG. 1A in a use state. FIG. 25 is a schematic structural diagram of the terminal 100 shown in FIG. 1A in another use state.

In an optional embodiment, the side frame 1 is provided with a left side surface 16 and a right side surface 17 that are disposed facing away from each other. When a user uses the terminal 100 and the front cover 2 faces the user, the left side surface 16 is close to a left-hand side of the user, and the right side surface 17 is close to a right-hand side of the user. A center surface between the left side surface 16 and the right side surface 17 is a central axis surface 18. The ambient light sensor 7 is located between the central axis surface 18 and the right side surface 17, and a spacing between the ambient light sensor 7 and the central axis surface 18 is less than a spacing between the ambient light sensor 7 and the right side surface 17. That is, the ambient light sensor 7 is disposed close to the central axis surface 18. In this case, a position of the first ink 21 disposed opposite to the light sensing surface 71 of the ambient light sensor 7 is disposed along with the position of the ambient light sensor 7, and the first ink 21 is disposed close to the central axis surface 18. As shown in FIG. 24, when the user holds the terminal 100 in a portrait mode, a probability that the first ink 21 is shielded by hands of the user is relatively small, and the ambient light sensor 7 can achieve a sensing function. As shown in FIG. 25, when the user holds the terminal 100 in a landscape mode, a probability that the first ink 21 is shielded by hands of the user is relatively small, and the ambient light sensor 7 can achieve a sensing function.

In this embodiment, the terminal 100 enables that the ambient light sensor 7 is disposed close to the central axis surface 18, to avoid a risk that the ambient light is shielded by a palm of a user and cannot be sensed by the ambient light sensor 7 when the user holds the terminal 100, thereby improving the sensing reliability of the ambient light sensor 7 of the terminal 100.

Figure 26:
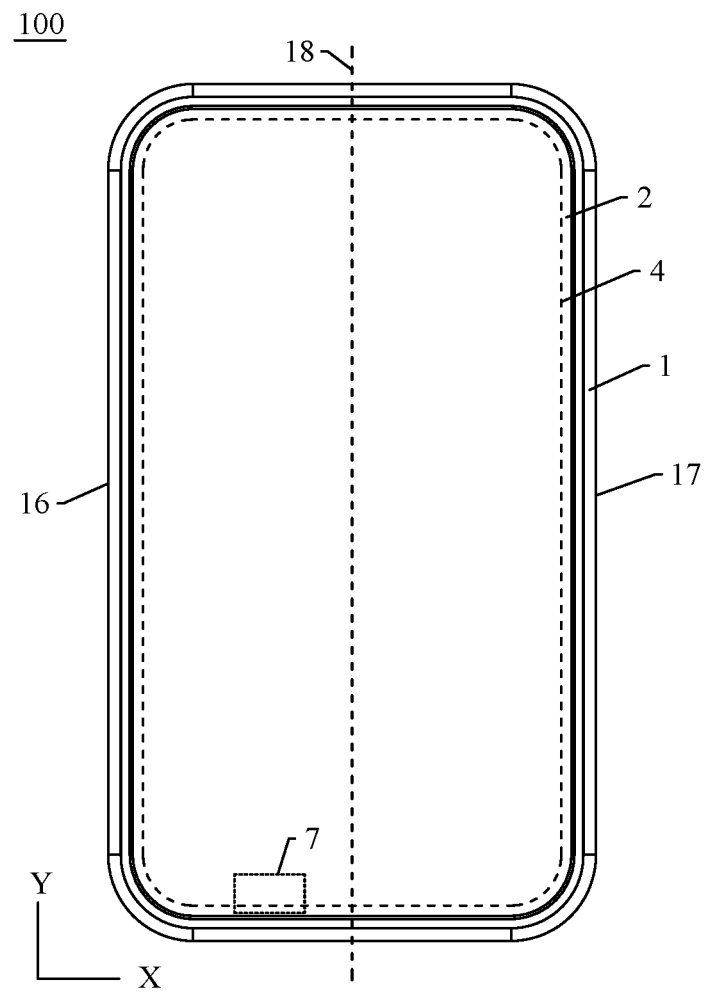
FIG. 26 is a schematic structural diagram of a terminal according to still another embodiment of this application.
Figure 27:
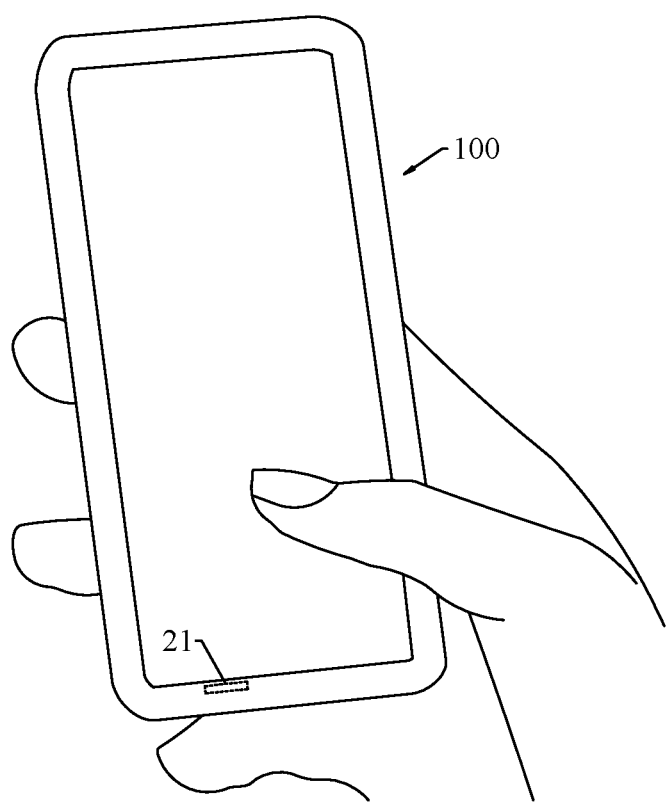
FIG. 27 is a schematic structural diagram of the terminal shown in FIG. 26 in a use state.

Referring to FIG. 26 and FIG. 27 together, FIG. 26 is a schematic structural diagram of a terminal 100 according to still another embodiment of this application. FIG. 27 is a schematic structural diagram of the terminal 100 shown in FIG. 26 in a use state. Most technical solutions in this embodiment that are the same as those in the foregoing embodiments are not described again.

The ambient light sensor 7 is located between the central axis surface 18 and the left side surface 16, and a spacing between the ambient light sensor 7 and the central axis surface 18 is less than a spacing between the ambient light sensor 7 and the left side surface 16. In this embodiment, the ambient light sensor 7 is disposed close to the central axis surface 18, and is located on the left side of the terminal 100, to consider that there are more people in the users who are accustomed to right-handed than people who are accustomed to left-right handed, so that the first ink 21 corresponding to the ambient light sensor 7 can be prevent from being shielded with a relatively high probability.

Figure 28:
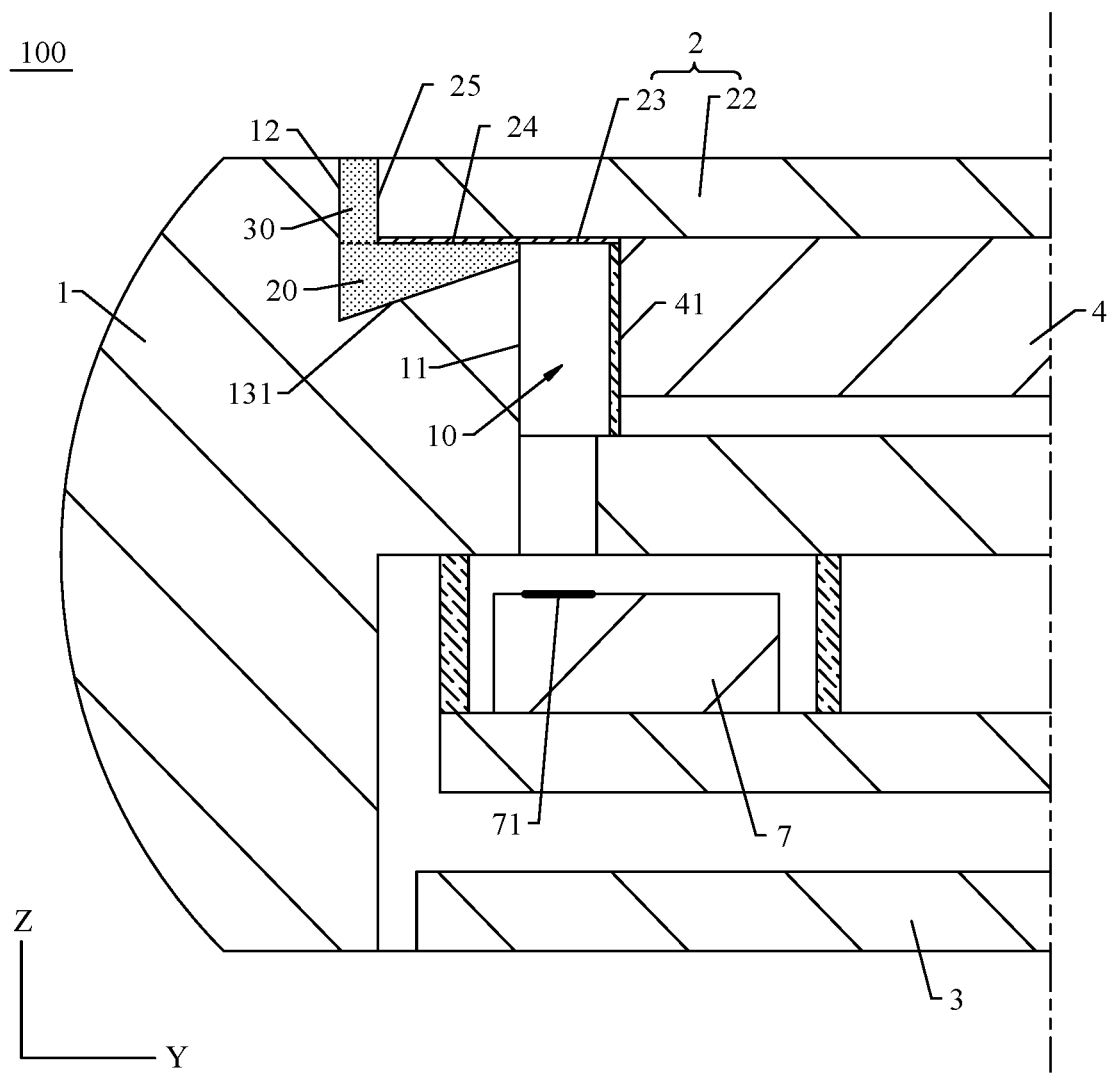
FIG. 28 is a schematic structural diagram of a terminal according to still another embodiment of this application.
Figure 29:
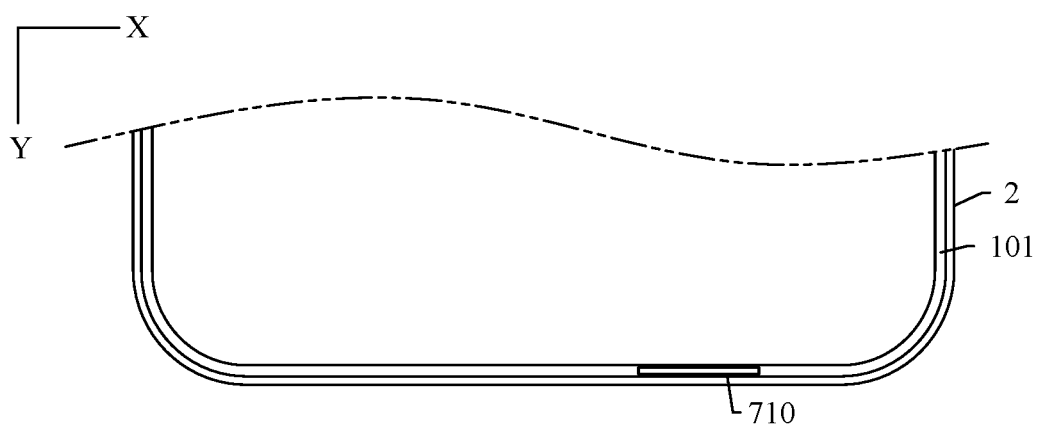
FIG. 29 is a schematic diagram of a projection of a partial structure of the terminal shown in FIG. 28 on a front cover.
Figure 30:
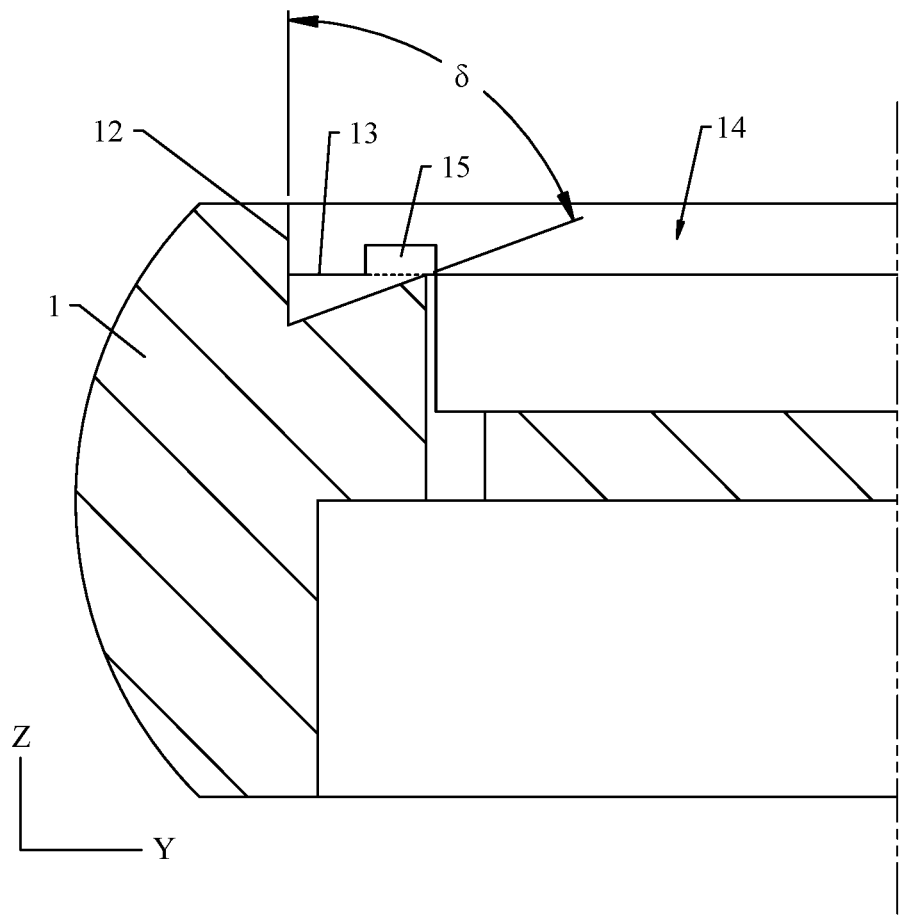
FIG. 30 is a schematic structural diagram of a partial structure of the terminal shown in FIG. 28.

Referring to FIG. 28 to FIG. 30 together, FIG. 28 is a schematic structural diagram of a terminal 100 according to still another embodiment of this application. FIG. 29 is a schematic diagram of a projection of a partial structure of the terminal 100 shown in FIG. 28 on a front cover 2. FIG. 30 is a schematic structural diagram of a partial structure of the terminal 100 shown in FIG. 28. Most technical solutions in this embodiment that are the same as those in the foregoing embodiments are not described again.

The terminal 100 includes a side frame 1, a front cover 2, a back cover 3, a display panel 4, and an ambient light sensor 7. The front cover 2 and the back cover 3 are disposed on two opposite sides of the side frame 1 respectively. The side frame 1 has a limiting surface 12 and a supporting surface 13 connected to the limiting surface 12. The limiting surface 12 encloses and forms a mounting space 14. The front cover 2 is partially or fully accommodated in the mounting space 14. The front cover 2 includes a bottom surface 24 and a side surface 25 connected to an edge of the bottom surface 24. The bottom surface 24 is fixedly connected to the supporting surface 13 by using an adhesive layer 20. The side surface 25 is fixedly connected to the limiting surface 12 by using the adhesive member 30. A gap is formed between the side surface 25 and the limiting surface 12, and the gap is filled with an adhesive member 30. The adhesive member 30 and the adhesive layer 20 are integrally cured and formed by using liquid transparent glue. The adhesive member 30 and the adhesive layer 20 formed after the liquid transparent glue is cured are generally white in appearance, and have specific light diffusion performance.

The display panel 4 is fastened to the bottom surface 24. An outer peripheral side 41 of the display panel 4 and an inner peripheral side 11 of the side frame 1 are disposed opposite to each other and form a light-transmitting gap 10 therebetween. The ambient light sensor 7 is located on an inner side of the side frame 1 and is located on one side of the display panel 4 facing the back cover 3. The light-transmitting gap 10 forms a first projection 101 on the front cover 2. A light sensing surface 71 of the ambient light sensor 7 forms a second projection 710 on the front cover 2. The first projection 101 covers the second projection 710. In this case, the light sensing surface 71 faces the light-transmitting gap 10. Ambient light can enter the light-transmitting gap 10 after undergoing a plurality of times of optical path changes in the adhesive member 30 and the adhesive layer 20.

In this embodiment of this application, because the ambient light sensor 7 is located on the one side of the display panel 4 facing the back cover 3, and the ambient light sensor 7 does not occupy a space of the peripheral side of the display panel 4, an arrangement space of the display panel 4 is relatively large, and a distance between the periphery of the display panel 4 and the side frame 1 is smaller, thereby improving a display area of the terminal 100, so that the terminal 100 has a relatively high screen-to-body ratio. In an embodiment, the terminal 100 can implement a full screen, and a screen-to-body ratio of the terminal 100 is greater than 90%.

Because the ambient light may enter the light-transmitting gap 10 through the adhesive member 30 and the adhesive layer 20, and is received by the light sensing surface 71 facing the light-transmitting gap 10, the ambient light sensor 7 may receive the ambient light through a gap between the front cover 2 and the side frame 1 and the light-transmitting gap 10 between the display panel 4 and the side frame 1. Therefore, even if no light-transmitting region configured to transmit the ambient light is disposed on the front cover 2, the ambient light sensor 7 can still receive sufficient ambient light, to accurately sense light intensity of an environment in which the terminal 100 is located, thereby meeting sensing requirements of the ambient light intensity of the terminal.

A main difference between this embodiment and the foregoing embodiments lies in that, in this embodiment, no first ink is provided. In this embodiment, the front cover 2 includes a substrate 22 and a second ink 23, and the second ink 23 forms a light shielding region of the front cover 2. The second ink 23 covers projections (that is, the first projection 101 and the second projection 710) of the light-transmitting gap 10 and the light sensing surface 71 of the ambient light sensor 7 on the substrate 22.

In this embodiment, a relatively large quantity of ambient light sensors 7 may be arranged, to obtain sufficient ambient light, thereby achieving reliable ambient light sensing.

A spacing between the light sensing surface 71 of the ambient light sensor 7 and the bottom surface 24 of the front cover 2 is greater than the thickness of the display panel 4 in the direction perpendicular to the front cover 2 (that is, the thickness direction Z of the terminal). In this embodiment, because the ambient light may enter the light-transmitting gap 10 by using the adhesive member 30 and the adhesive layer 20, so that the ambient light sensor 7 located on the other side of the light-transmitting gap 10 can sense sufficient ambient light. Therefore, a spacing between the ambient light sensor 7 and the front cover 2 is no longer strictly limited, and the spacing may vary with the thickness of the display panel 4, so that the ambient light sensor 7 is located below the display panel 4.

The ambient light sensor 7 is arranged below the display panel 4, and may be deployed on a circuit board (for example, a main board or an auxiliary board) or a flexible circuit board in the terminal 100. Therefore, there is a relatively low requirement on a size specification of a component of the ambient light sensor 7, and the terminal 100 is applicable to more types and sizes of ambient light sensors 7, thereby achieving higher flexibility.

Figure 31:
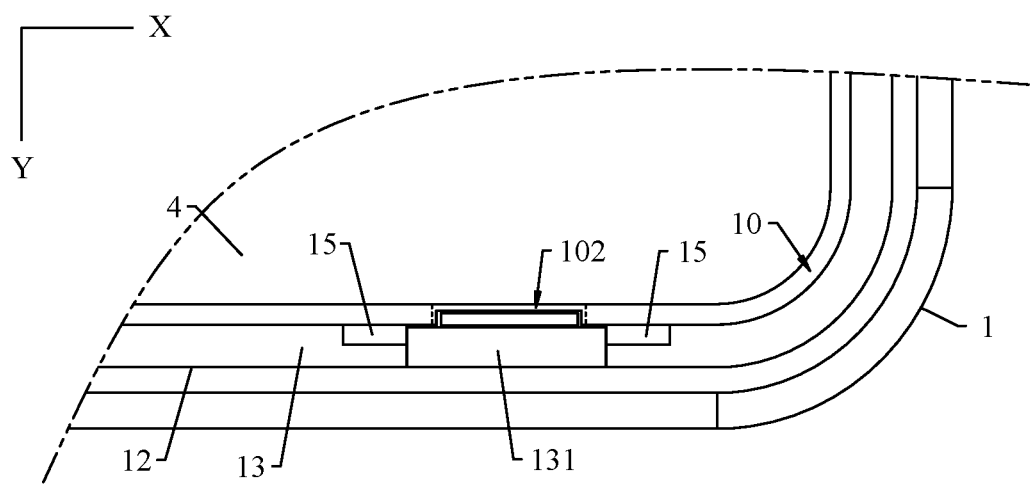
FIG. 31 is a schematic diagram of a partial structure of the terminal shown in FIG. 28.

Referring to FIG. 30 and FIG. 31 together, FIG. 31 is a schematic diagram of a partial structure of the terminal 100 shown in FIG. 28.

Optionally, the light-transmitting gap 10 includes a light sensing portion 102 facing the light sensing surface 71. The supporting surface 13 includes an inclined portion 131. The inclined portion 131 is located between the limiting surface 12 and the light sensing portion 102. An acute angle δ is formed between the inclined portion 131 and the limiting surface 12. The acute angle δ is less than or equal to 60°, for example, 45°, 50°, 55°, or 60°.

In this embodiment, the inclined portion 131 is disposed close to the light sensing portion 102. Because the acute angle δ is formed between the inclined portion 131 and the limiting surface 12, when the liquid transparent glue is coated on the supporting surface 13, the inclined portion 131 can enable the glue to flow in a direction away from the light sensing portion 102, and the glue on the inclined portion 131 is prevented from overflowing and entering the light sensing portion 102, to avoid overflow glue in the adhesive layer 20 that shields the ambient light sensor 7 from receiving the optical path, thereby improving the product yield of the terminal 100.

In an extending direction of the light-transmitting gap 10, a length of the inclined portion 131 is greater than a length of the light sensing portion 102. In this case, a risk of overflowing glue from the adhesive layer 20 into the light sensing portion 102 is lower.

The side frame 1 includes at least two supporting platforms 15 protruding from the supporting surface 13. The at least two supporting platforms 15 are located on two sides of the inclined portion 131 respectively. In this embodiment, when the front cover 2 is fastened to the side frame 1, the supporting platform 15 can support the front cover 2, so as to ensure an adhesion effect of the adhesive layer 20, and avoid that when the liquid glue is not cured, a large quantity of glue penetrates into the light sensing portion 102 of the light-transmitting gap caused by excessively pressing the liquid glue, thereby improving the product yield of the terminal 100.

A plurality of diffusion particles are scattered in the adhesive member 30 and the adhesive layer 20. Particles of different diameters may exist in the plurality of diffusion particles. A particle size range of the diffusion particles is 50 nanometers (nm) to 100 micrometers (μm). Materials of the diffusion particles are not limited to titanium oxide, polymethyl methacrylate, silicon dioxide, metal ions, and the like. The plurality of diffusion particles help improve the light diffusion performance of the adhesive member 30 and the adhesive layer 20.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. The embodiments in this application and features in the implementations can be combined with each other if there is no conflict. Therefore, the protection scope of the present invention shall be subject to the protection scope of the claims.

What is claimed is:

1. A terminal, comprising:
   a side frame;
   a front cover and a back cover, wherein the front cover and the back cover respectively cover two opposite sides of the side frame;
   a display panel fastened to one side of the front cover facing the back cover, wherein an outer peripheral side of the display panel and an inner peripheral side of the side frame are disposed opposite to each other and form a light-transmitting gap therebetween and the light-transmitting gap continuously surrounds the periphery of the display panel; and
   an ambient light sensor located on an inner side of the side frame and located on one side of the display panel facing the back cover,
   wherein, the light-transmitting gap forms a first projection on the front cover, a light sensing surface of the ambient light sensor forms a second projection on the front cover, and the first projection covers the second projection, and
   wherein the front cover is provided with a first ink covering the second projection, and ambient light can enter the light sensing surface after undergoing a plurality of times of optical path changes in the first ink, and a half-light intensity angle obtained when the ambient light sensor receives the ambient light through the first ink is greater than or equal to 30°.

2. The terminal according to claim 1, wherein a light transmittance of the first ink is greater than or equal to 1%.

3. The terminal according to claim 1, wherein the first ink comprises at least two light uniform layers that are stacked, and a plurality of diffusion particles are scattered in each of the light uniform layers.

4. The terminal according to claim 3, wherein the front cover comprises a substrate, the first ink, and a second ink, the second ink is located on a surface of the substrate facing the back cover, the second ink is provided with a hollow region facing the light sensing surface, the first ink covers the hollow region, and a light transmittance of the second ink is less than a light transmittance of the first ink.

5. The terminal according to claim 4, wherein the first ink further comprises a color layer, the color layer is located between the at least two light uniform layers and the substrate, a color of the color layer is the same as a color of the second ink, and a light transmittance of the color layer is greater than the light transmittance of the second ink.

6. The terminal according to claim 1, wherein sensitivity of the ambient light sensor is less than or equal to 0.0012 Lux/count.

7. The terminal according to claim 6, wherein the light sensing surface comprises a first light sensing channel and a second light sensing channel;
the first light sensing channel comprises a plurality of first light sensing units, and the second light sensing channel comprises a plurality of second light sensing units;
the plurality of first light sensing units and the plurality of second light sensing units jointly form a light sensing unit array; and
the first light sensing units and the second light sensing units are alternately arranged in a row direction and a column direction of the light sensing unit array, and the row direction or the column direction is the same as an extending direction of the first projection.

8. The terminal according to claim 7, wherein
the row direction is the same as the extending direction of the first projection, and in the light sensing unit array, a total quantity of first light sensing units and second light sensing units that are located in a same row is greater than a total quantity of first light sensing units and second light sensing units that are located in a same column; or
the column direction is the same as the extending direction of the first projection, and in the light sensing unit array, a total quantity of first light sensing units and second light sensing units that are located in a same column is greater than a total quantity of first light sensing units and second light sensing units that are located in a same row.

9. The terminal according to claim 1, wherein in an extending direction of the first projection, a size of the first ink is greater than or equal to $2 \times S \times \tan \beta$, S is a spacing between the front cover and the light sensing surface, and $\beta$ is a device half-light intensity angle of the ambient light sensor.

10. The terminal according to claim 1, further comprising a light shielding member, wherein the light shielding member is located between the outer peripheral side of the display panel and the inner peripheral side of the side frame, and the light shielding member covers the outer peripheral side of the display panel.

11. The terminal according to claim 1, wherein the side frame has a limiting surface and a supporting surface connected to the limiting surface, the limiting surface encloses and forms a mounting space, the front cover is partially or fully accommodated in the mounting space, the front cover comprises a bottom surface and a side surface connected to an edge of the bottom surface, the bottom surface is fixedly connected to the supporting surface by using an adhesive layer, and the side surface faces the limiting surface.

12. The terminal according to claim 11, wherein the light-transmitting gap comprises a light sensing portion facing the first ink, the supporting surface comprises an inclined portion, the inclined portion is located between the limiting surface and the light sensing portion, an acute angle is formed between the inclined portion and the limiting surface, and the adhesive layer is formed by curing liquid glue.

13. The terminal according to claim 12, wherein the side frame comprises at least two supporting platforms protruding from the supporting surface, and the at least two supporting platforms are located on two sides of the inclined portion respectively.

14. The terminal according to claim 12, wherein a gap is formed between the side surface and the limiting surface, the gap is filled with an adhesive member, the adhesive member and the adhesive layer are integrally cured and formed by using liquid transparent glue, and the ambient light can enter the light-transmitting gap after undergoing a plurality of times of optical path changes in the adhesive member and the adhesive layer.

15. A terminal, comprising:
a side frame provided with a limiting surface and a supporting surface connected to the limiting surface, the limiting surface encloses and forms a mounting space;
a front cover and a back cover that respectively cover two opposite sides of the side frame, the front cover is partially or fully accommodated in the mounting space, the front cover comprises a bottom surface and a side surface connected to an edge of the bottom surface, the bottom surface is fixedly connected to the supporting surface by using an adhesive layer, the side surface is fixedly connected to the limiting surface by using an adhesive member, and the adhesive member and the adhesive layer are integrally cured and formed by using liquid transparent glue;
a display panel fastened to the bottom surface, an outer peripheral side of the display panel and an inner peripheral side of the side frame are disposed opposite to each other and form a light-transmitting gap therebetween; and
an ambient light sensor located on an inner side of the side frame and located on one side of the display panel facing the back cover,
wherein, the light-transmitting gap forms a first projection on the front cover, a light sensing surface of the ambient light sensor forms a second projection on the front cover, the first projection covers the second projection, and ambient light can enter the light-transmitting gap after undergoing a plurality of times of optical path changes in the adhesive member and the adhesive layer.

16. The terminal according to claim 15, wherein the light-transmitting gap comprises a light sensing portion facing the light sensing surface, the supporting surface comprises an inclined portion, the inclined portion is located between the limiting surface and the light sensing portion, and an acute angle is formed between the inclined portion and the limiting surface.

17. The terminal according to claim 16, wherein the side frame comprises at least two supporting platforms protruding from the supporting surface, and the at least two supporting platforms are located on two sides of the inclined portion respectively.

18. The terminal according to claim 15, wherein a plurality of diffusion particles are scattered in the adhesive member and the adhesive layer.

19. The terminal according to claim 15, wherein a spacing between the light sensing surface and the bottom surface is greater than a thickness of the display panel in a direction perpendicular to the front cover.

20. The terminal according to claim 15, further comprising a first part and a second part, wherein:
 the first part comprises the side frame, the front cover, the back cover, the display panel, and the ambient light sensor; and
 the second part and the first part are slidable relative to each other.

* * * * *